United States Patent
Jin et al.

(10) Patent No.: US 12,407,432 B2
(45) Date of Patent: Sep. 2, 2025

(54) METHOD AND APPARATUS FOR DYNAMICALLY CONFIGURING CHANNEL LOSS MEASUREMENT IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Hoondong Noh, Suwon-si (KR); Jinhyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/484,904

(22) Filed: Oct. 11, 2023

(65) Prior Publication Data

US 2024/0048252 A1 Feb. 8, 2024

Related U.S. Application Data

(63) Continuation of application No. 17/036,634, filed on Sep. 29, 2020, now Pat. No. 11,791,915.

(30) Foreign Application Priority Data

Nov. 7, 2019 (KR) .......... 10-2019-0141959
Dec. 18, 2019 (KR) .......... 10-2019-0169900

(51) Int. Cl.
*H04B 17/309* (2015.01)
*H04W 24/08* (2009.01)
*H04W 88/02* (2009.01)

(52) U.S. Cl.
CPC .......... *H04B 17/309* (2015.01); *H04W 24/08* (2013.01); *H04W 88/02* (2013.01)

(58) Field of Classification Search
CPC .... H04B 17/309; H04W 24/08; H04W 88/02; H04W 52/54; H04W 52/146;
(Continued)

(56) References Cited

U.S. PATENT DOCUMENTS 10,439,847 B2 10/2019 Park et al.
10,638,355 B2 4/2020 Kim et al.
(Continued)

FOREIGN PATENT DOCUMENTS

CN 110089162 A 8/2019
CN 110249658 A 9/2019
(Continued)

OTHER PUBLICATIONS

Moderator (LG Electronics), Summary#1 of email thread [102-e-NR-eMIMO-01], 3GPP TSG RAN WG1 #102-e, TS 38.213, R1-2007006, Aug. 17-28, 2020.
(Continued)

*Primary Examiner* — Walli Z Butt
(74) *Attorney, Agent, or Firm* — Jefferson IP Law, LLP

(57) ABSTRACT

A communication method and system for converging a 5th generation (5G) communication system for supporting higher data rates beyond a 4th generation (4G) system with a technology for Internet of Things (IoT) is provided. The disclosure relates to an intelligent services based on the 5G communication technology and the IoT-related technology, such as smart home, smart building, smart city, smart car, connected car, health care, digital education, smart retail, security and safety services. Further, a method and an apparatus for dynamically configuring channel loss measurement is provided.

20 Claims, 29 Drawing Sheets

(58) Field of Classification Search
CPC . H04W 52/242; H04W 52/325; H04W 72/23; H04L 5/0053
See application file for complete search history.

(56) References Cited

U.S. PATENT DOCUMENTS

| | | | | |
|---|---|---|---|---|
| 11,791,915 | B2* | 10/2023 | Jin | H04B 17/309 370/252 |
| 2018/0206132 | A1* | 7/2018 | Guo | H04W 72/0473 |
| 2019/0190747 | A1 | 6/2019 | Park et al. | |
| 2019/0281588 | A1* | 9/2019 | Zhang | H04W 52/08 |
| 2019/0349059 | A1* | 11/2019 | John Wilson | H04B 7/0695 |
| 2019/0387479 | A1 | 12/2019 | Gong et al. | |
| 2020/0068497 | A1 | 2/2020 | Gong et al. | |
| 2021/0120500 | A1 | 4/2021 | Zhou et al. | |
| 2021/0159991 | A1 | 5/2021 | Zhou et al. | |

FOREIGN PATENT DOCUMENTS

| | | |
|---|---|---|
| CN | 110366867 A | 10/2019 |
| KR | 10-2019-0039398 A | 4/2019 |

OTHER PUBLICATIONS

RAN WG1, LS on MIMO enhancement for NR, 3GPP TSG RAN WG1 Meeting #97, R1-1907966, Reno, USA, May 13-17, 2019.
MCC Support, Final Report of 3GPP TSG RAN WG1 #98bis v2.0.0, R1-1913275, Reno, USA, Nov. 18-22, 2019.
LG Electronics, 'Feature lead summary of Enhancements on Multi-beam Operations', R1-1910590, 3GPP TSG RAN WG1 #98bis, Chongqing, China, Oct. 22, 2019.
Ericsson, 'Remaining issues for NR power control', R1-1807265, 3GPP TSG RAN WG1 #93, Busan, Korea, May 12, 2018.
Ericsson, 'Text Proposal for MAC specification on Quality Report', R2-1913414, 3GPP TSG RAN WG2 #107b, Chongqing, China, Oct. 4, 2019.
Zte, 'Maintenance for UL power control', R1-1808200, 3GPP TSG RAN WG1 #94, Gothenburg, Sweden, Aug. 11, 2018.
International Search Report dated Jan. 8, 2021, issued in International Patent Application No. PCT/KR2020/013408.
ZTE, "Summary for AI 7.1.5 Maintenance for UL power control", 3GPP TSG RAN WG 1 Meeting #97 Reno, USA, R1-1907739, May 16, 2019.
LG Electronics, "Feature lead summary#5 of Enhancements on Multi-beam Operations", 3GPP TSG RAN WG1 Meeting #98bis Chongqing, China, R1-1911593, Oct. 22, 2019.
Extended European Search Report dated Mar. 25, 2022, issued in European Patent Application No. 20883278.2.
Counterpart European Office Action dated Nov. 16, 2022, issued in European Patent Application No. 20 883 278.2.
European Office Action dated May 12, 2023, issued in European Application No. 20 883 278.2.
Huawei et al., Enhancements on multi-beam operation, 3GPP TSG RAN WG1 Meeting #98bis, R1-1910074, Oct. 2019.
Chinese Office Action dated Nov. 23, 2023, issued in Chinese Application No. 202080006441.6.
European Office Action dated Nov. 16, 2023, issued in European Application No. 20 883 278.2-1216.
European Office Action dated May 22, 2024, issued in European Application No. 20 883 278.2-1215.
LG Electronics, Enhancements on multi-TRP/panel transmission, R1-1910582, 3GPP TSG RAN WG1 #98bis, Chongqing, China, Oct. 14-20, 2019.
ZTE et al., Offline proposals for NR power control in non-CA aspects, R1-1801137, 3GPP TSG RAN WG1 Meeting AH 1801, Vancouver, Canada, Jan. 22-26, 2018.
Nokia et al., Feature lead summary#3 on 2 step RACH procedures, R1-1907900, 3GPP TSG RAN WG1 #97, Reno, USA, May 13-17, 2019.
CMCC, Enhancements on multi-beam operation, R1-1908870, 3GPP TSG RAN WG1 #98, Prague, CZ, Aug. 26-30, 2019.
Korean Office Action dated Feb. 27, 2025, issued in Korean Application No. 10-2019-0141959.
Korean Notice of Allowance dated Jan. 24, 2025, issued in Korean Application No. 10-2019-0169900.

* cited by examiner

FIG. 17
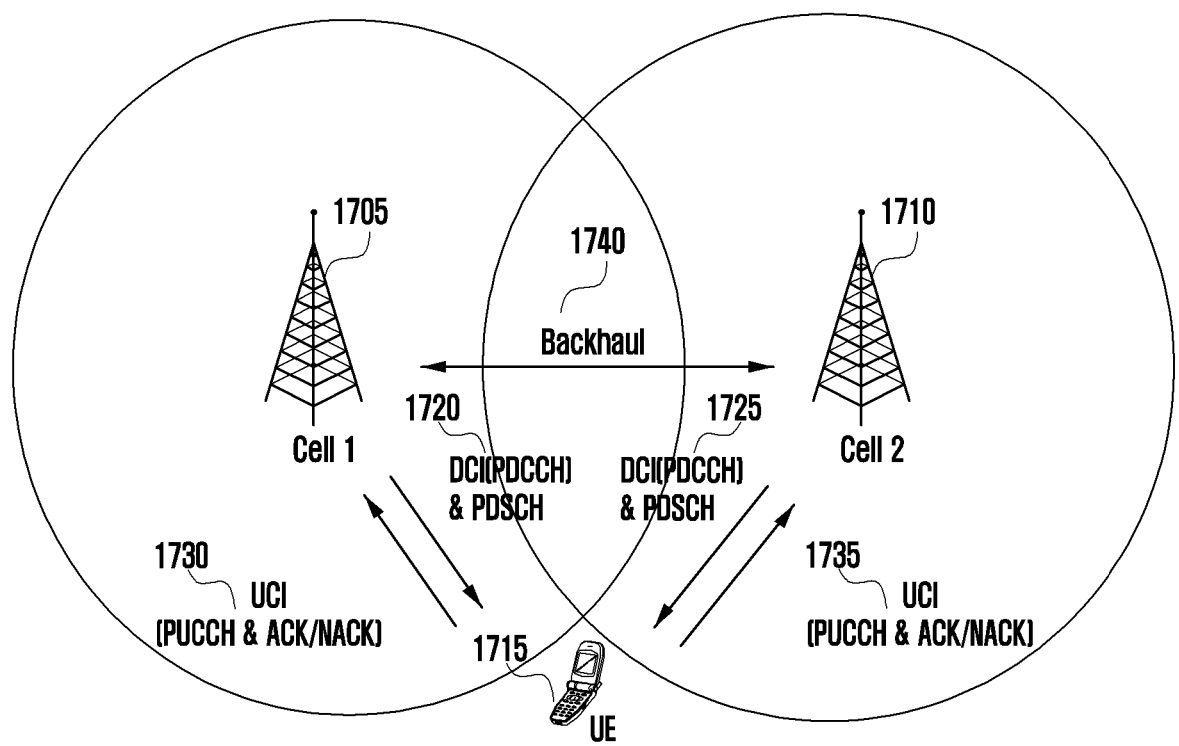
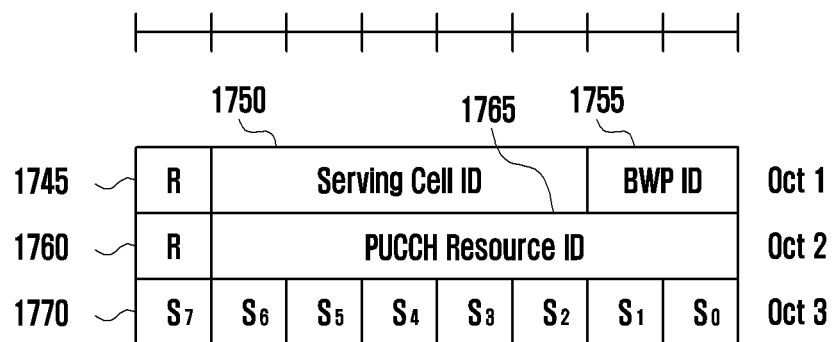
PUCCH spatial relation Activation/Deactivation MAC CE Option 1 : Indicate the group ID for PUCCH resources and use beam ID Option 1-1 : List of PUCCH resources can be indicated by a single spatial info
(explicit ID for spatial info)

METHOD AND APPARATUS FOR DYNAMICALLY CONFIGURING CHANNEL LOSS MEASUREMENT IN NEXT-GENERATION MOBILE COMMUNICATION SYSTEM

CROSS-REFERENCE TO RELATED APPLICATION(S)

This application a continuation application of prior application Ser. No. 17/036,634, filed on Sep. 29, 2020, which was based on and claimed priority under 35 U.S.C. 119(a) of a Korean patent application number 10-2019-0141959 filed on Nov. 7, 2019, in the Korean Intellectual Property Office, and of a Korean patent application number 10-2019-0169900, filed on Dec. 18, 2019, in the Korean Intellectual Property Office, the disclosure of each of which is incorporated by reference herein in its entirety.

BACKGROUND

1. Field

The disclosure relates to the operations of a user equipment (UE) and a base station in a mobile communication system. More particularly, the disclosure relates to improving a method of measuring and applying path loss using a multiple-input and multiple-output (MIMO) capability in a next-generation mobile communication system by using a beam.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency millimeter (mm) Wave bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G communication system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

There is a need for a method for updating beam information in relation to an operation of a terminal configuring and activating beam information (spatial relation) used for physical uplink control channel (PUCCH) transmission.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for improving an existing method of measuring and applying path loss using a multiple-input and multiple-output (MIMO) capability in a next-generation mobile communication system using a beam, particularly in a method in which a user equipment (UE) measures path loss in a communication channel and applies the pass loss. In particular, pass loss measurement may be increased due to an increase in the number of transmission and reception antennas of a UE, and an operation of dynamically updating valid path loss measurement may be needed.

Additional aspects will be set forth in part in the description which follows and, in part, will be apparent from the description, or may be learned by practice of the presented embodiments.

Further, the disclosure relates to an operation of a UE configuring and activating beam information (spatial relation) used for physical uplink control channel (PUCCH) transmission in a next-generation mobile communication system using a beam. Generally, it is possible to update or indicate a beam (spatial relation) through a single medium access control (MAC) control element (MAC CE) for a PUCCH resource in a specific bandwidth part (BWP) within one serving cell. However, since a plurality of PUCCH resources may be configured in one serving cell and a BWP, a plurality of MAC CE transmissions is required to update beam information about all the configured PUCCH resources, thus causing an increase in signaling and latency time.

Technical tasks to be achieved in the disclosure are not limited to the technical aspects mentioned above, and other technical aspects not mentioned will be clearly understood by those skilled in the art from the following description.

According to an embodiment, it is possible to dynamically measure and apply a plurality of path loss resources configured by a base station in a next-generation mobile communication system using a beam, particularly in a method in which a UE measures path loss in a communication channel and applies the pass loss.

Further, beam information applied to transmission of a PUCCH resource configured in a BWP of a serving cell may be updated by being commonly applied to a plurality of PUCCH resources rather than being indicated per individual PUCCH resource in a next-generation mobile communication system, thereby reducing latency time in applying a corresponding configuration and reducing signaling overhead for the update.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 illustrates a structure of a next-generation mobile communication system and a scenario in which a PUCCH resource configuration and a beam activation operation are applied according to an embodiment of the disclosure;

DETAILED DESCRIPTION

The following description with reference to the accompanying drawings is provided to assist in a comprehensive understanding of various embodiments of the disclosure as defined by the claims and their equivalents. It includes various specific detailed to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, for convenience of explanation, terms and designations defined in 3rd Generation Partnership Project Long-Term Evolution (3GPP LTE) standards are used in the disclosure. However, the disclosure is not limited by those terms and designations but may be equally applied to systems in accordance with other standards.

Figure 1:
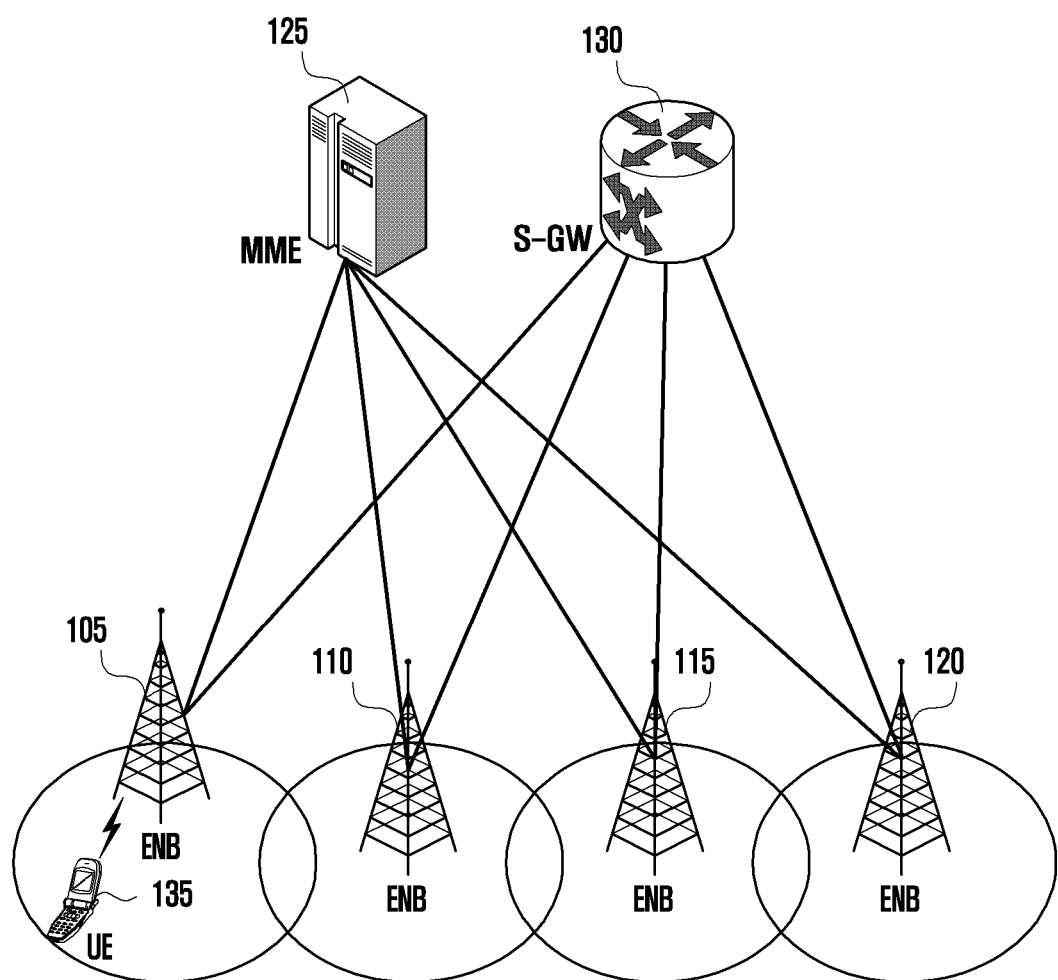
FIG. 1 illustrates a structure of an LTE system according to an embodiment of the disclosure.

FIG. 1 illustrates a structure of an LTE system according to an embodiment of the disclosure.

Referring to FIG. 1, a radio access network of the LTE system may include an evolved node B (hereinafter, "eNB", "Node B", or "base station") 105, 110, 115, or 120, a mobility management entity (MME) 125, and a serving gateway (S-GW) 130. A user equipment (hereinafter, "UE" or "terminal") 135 accesses an external network through the eNBs 105, 110, 115, and 120 and the S-GW 130.

Referring to FIG. 1, the eNBs 105, 110, 115, and 120 correspond to existing nodes B of a universal mobile telecommunications system (UMTS). The eNBs 105, 110, 115, and 120 are connected to the UE 135 over a wireless channel and perform a more complex role than that of the existing Nodes B. In the LTE system, all user traffic including a real-time service, such as a voice over Internet protocol (VoIP) service, is provided through a shared channel. Therefore, a device that collects state information, such as buffer status, available transmission power state, and channel state of UEs (e.g., the UE 135), and performs scheduling is required. The eNBs 105, 110, 115, and 120 are responsible for these functions. One eNB 105, 110, 115, or 120 generally controls a plurality of cells. For example, in order to realize a transmission speed of 100 Mbps, the LTE system uses orthogonal frequency division multiplexing (hereinafter, "OFDM") as a radio access technology, for example, at a bandwidth of 20 megahertz (MHz). In addition, the LTE system applies adaptive modulation & coding (hereinafter, "AMC"), which determines a modulation scheme and a channel coding rate according to the channel state of the UE 135. The S-GW 130 is a device that provides a data bearer and generates or removes a data bearer under the control of the MME 125. The MME 125 is a device that performs not only a mobility management function for the UE 135 but also various control functions and is connected to a plurality of base stations 105, 110, 115, and 120.

Figure 2:
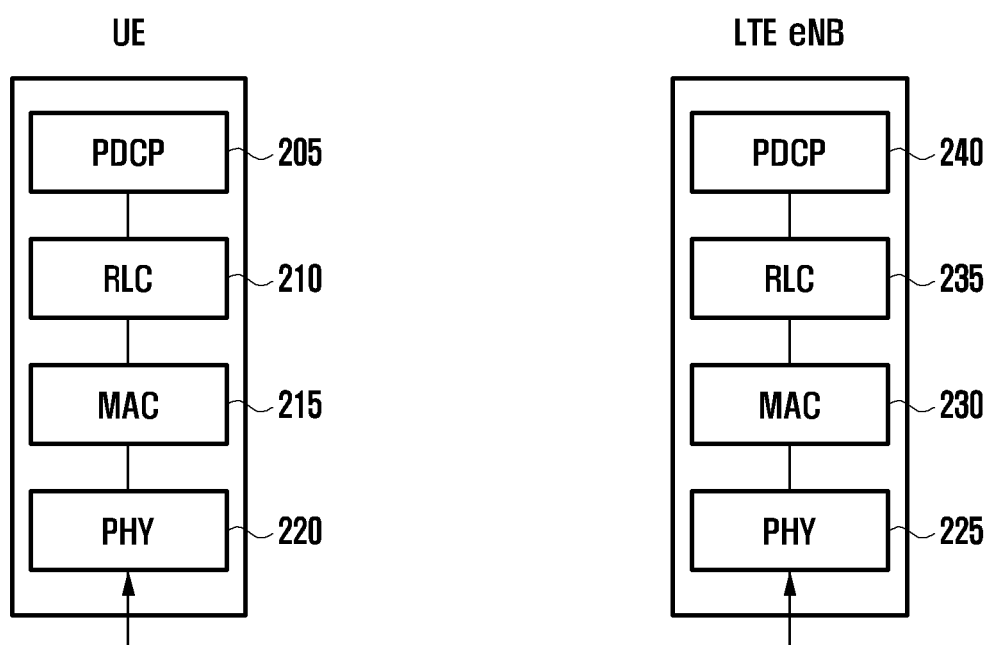
FIG. 2 illustrates a wireless protocol structure of an LTE system according to an embodiment of the disclosure.

FIG. 2 illustrates a wireless protocol structure of an LTE system according to an embodiment of the disclosure.

Referring to FIG. 2, a wireless protocol of the LTE system includes packet data convergence protocols (PDCPs) 205 and 240, radio link controls (RLCs) 210 and 235, and medium access controls (MACs) 215 and 230 respectively in a UE and an eNB. The PDCPs 205 and 240 are responsible for IP header compression/decompression or the like. Main functions of the PDCPs 205 and 240 are summarized as follows.

Header compression and decompression (robust header compression (ROHC) only)
Transfer of user data
In-sequence delivery of upper-layer PDUs at PDCP re-establishment procedure for RLC AM
For split bearers in DC (only support for RLC AM), PDCP PDU routing for transmission and PDCP PDU reordering for reception
Duplicate detection of lower-layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link controls (hereinafter, "RLCs") 210 and 235 reconstructs a PDCP packet data unit (PDU) into a proper size and performs an automatic repeat request (ARQ) operation. Main functions of the RLCs 210 and 235 are summarized as follows.

Transfer of upper-layer PDUs
Error Correction through ARQ (only for AM data transfer)
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 215 and 230 are connected to a plurality of RLC-layer devices configured in one UE, multiplex RLC PDUs into a MAC PDU, and demultiplex an MAC PDU into RLC PDUs. Main functions of the MACs 215 and 230 are summarized as follows.

Mapping between logical channels and transport channels
Multiplexing/demultiplexing of MAC SDUs belonging to one or different logical channels into/from Transport Blocks (TBs) delivered to/from the physical layer on transport channels
Scheduling information reporting
Error correction through HARQ
Priority handling between logical channels of one UE
Priority handling between UEs by means of dynamic scheduling
Multimedia broadcast/Multicast (MBMS) service identification
Transport format selection
Padding Physical (PHY) layers 220 and 225 perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer. The PHY layers 220 and 225 also use hybrid ARQ (HARQ) for additional error correction, in which a receiver transmits one bit to indicate whether a packet transmitted from a transmitter is received. This is referred to as HARQ ACK/NACK information. Downlink HARQ ACK/NACK information in response to uplink transmission may be transmitted through a physical channel, such as a physical hybrid-ARQ indicator channel (PHICH), and uplink HARQ ACK/NACK information in response to downlink transmission may be transmitted through a physical channel, such as a physical uplink control channel (PUCCH) or physical uplink shared channel (PUSCH).

The PHY layers 220 and 225 may include one frequency/carrier or a plurality of frequencies/carriers, and a technology of simultaneously configuring and using a plurality of frequencies is referred to as carrier aggregation (hereinafter, "CA"). In CA, instead of using one carrier, a main carrier and one additional subcarrier or a plurality of additional subcarriers is used for communication between a terminal (or UE) and a base station (E-UTRAN NodeB: eNB), thereby dramatically increasing the transmission amount in relation to the number of subcarriers. In LTE, a cell of a base station using a main carrier is referred to as a primary cell (PCell), and a cell using a subcarrier is referred to as a secondary cell (SCell).

Although not shown in the drawing, a radio resource control (hereinafter, "RRC") layer exists above the PDCP layer of each of the UE and the base station. The RRC layer may exchange connection and measurement-related setup control messages for radio resource control.

Figure 3:
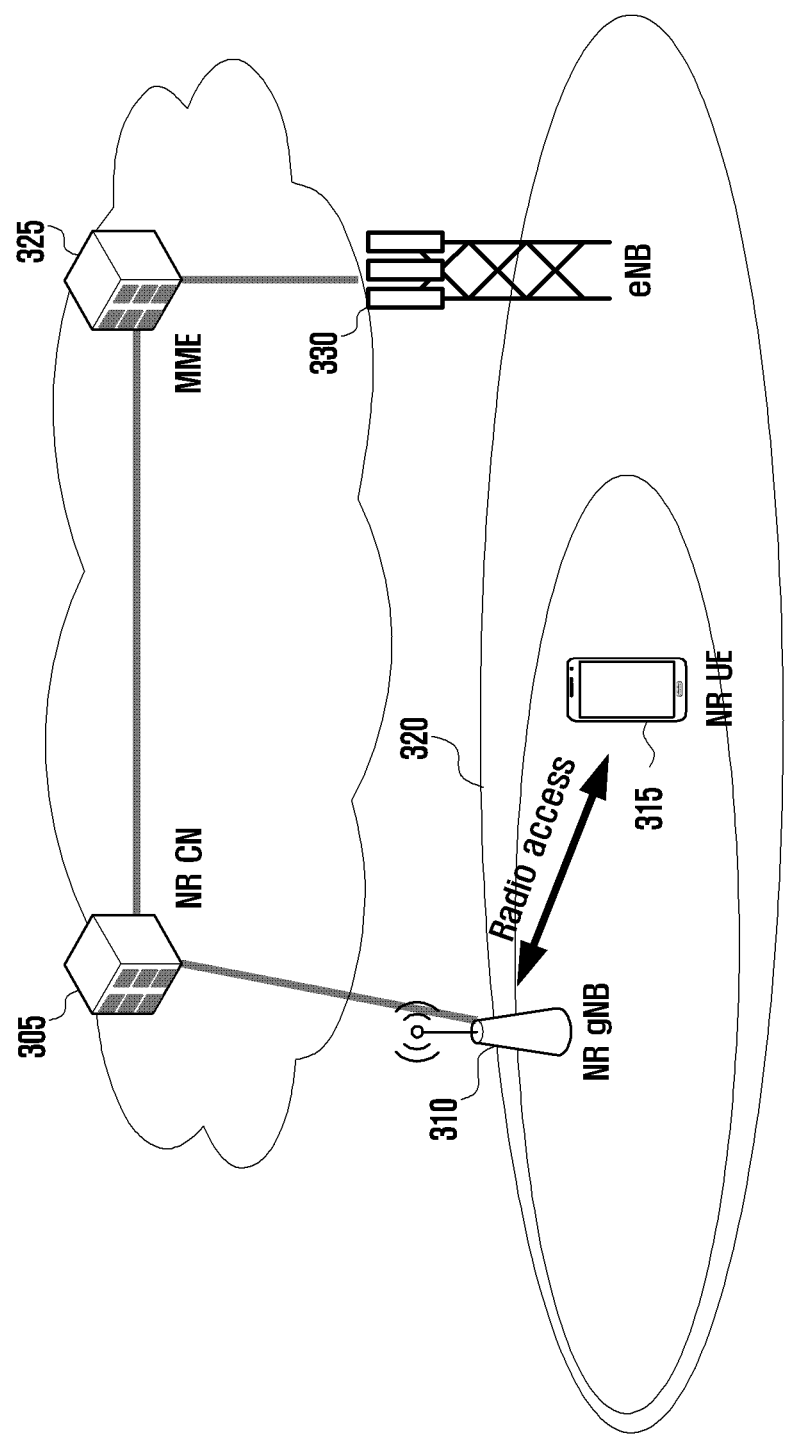
FIG. 3 illustrates a structure of a next-generation mobile communication system according to an embodiment of the disclosure.

FIG. 3 illustrates the structure of a next-generation mobile communication system according to an embodiment of the disclosure.

Referring to FIG. 3, a radio access network of the next-generation mobile communication system includes a new radio node B (hereinafter, "NR NB" or "gNB") 310 and a new radio core network (NR CN or next-generation core network (NG CN)) 305. A new radio user equipment (hereinafter, "NR UE" or "terminal") 315 accesses an external network through the NR gNB 310 and the NR CN 305.

Referring to FIG. 3, the NR gNB 310 corresponds to an evolved node B (eNB) of an existing LTE system. The NR gNB 310 is connected to the NR UE 315 over a wireless channel and may provide a more advanced service than that of the existing node B. In the next-generation mobile communication system, all user traffic may be served through a shared channel. Therefore, a device that collects state information, such as buffer status, available transmission power state, and channel state of UEs (e.g., NR UE 315), and performs scheduling is required. The NR gNB 310 is responsible for these functions. One NR gNB 310 generally controls a plurality of cells. The next-generation mobile communication system may have a bandwidth greater than the existing maximum bandwidth in order to realize ultra-high-speed data transmission compared to a current LTE. Further, the next-generation mobile communication system may employ a beamforming technique in addition to OFDM as a radio access technology. In addition, the next-generation mobile communication system applies AMC, which determines a modulation scheme and a channel coding rate according to the channel state of the NR UE 315. The NR CN 305 performs functions of mobility support, bearer setup, and quality of service (QoS) setup. The NR CN 305 is a device that performs not only a mobility management function for the NR UE 315 but also various control functions and is connected to a plurality of base stations (e.g., NR gNB 310). The next-generation mobile communication system may also interwork with the existing LTE system, in which case the NR CN 305 is connected to an MME 325 through a network interface. The MME 325 is connected to an eNB 330, which is an existing base station.

Figure 4:
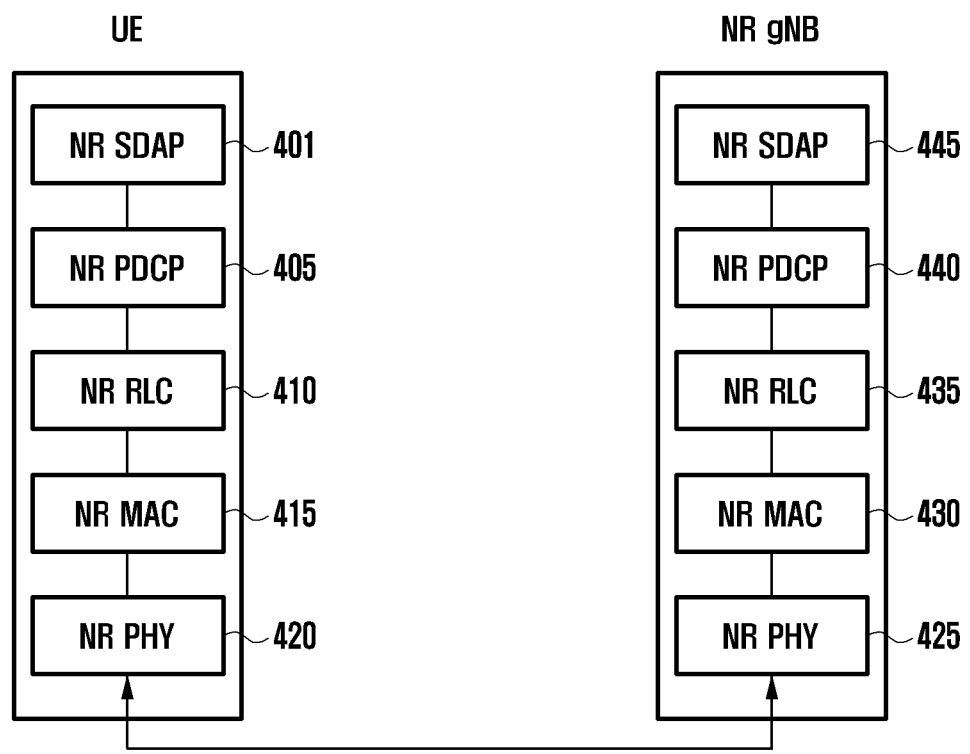
FIG. 4 illustrates a wireless protocol structure of a next-generation mobile communication system according to an embodiment of the disclosure.

FIG. 4 illustrates the wireless protocol structure of a next-generation mobile communication system according to an embodiment of the disclosure.

Referring to FIG. 4, a wireless protocol of the next-generation mobile communication system includes NR SDAPs 401 and 445, NR PDCPs 405 and 440, NR RLCs 410 and 435, and NR MACs 415 and 430 respectively at a UE and an NR base station.

Main functions of the NR SDAPs 401 and 445 may include some of the following functions.

Transfer of user plane data
Mapping between QoS flow and DRB for both DL and UL
Marking QoS flow ID in both DL and UL packets
Reflective QoS flow-to-DRB mapping for UL SDAP PDUs Regarding the SDAP-layer devices, the UE may receive a configuration about whether to use a header of the SDAP-layer devices or whether to use a function of the SDAP-layer devices for each PDCP-layer device, each bearer, or each logical channel via an RRC message. When an SDAP header is configured, a one-bit NAS QoS reflective indicator (NAS reflective QoS) and a one-bit AS QoS reflective indicator (AS reflective QoS) of the SDAP header may be used for indication to enable the UE to update or reconfigure uplink and downlink QoS flows and mapping information for a data bearer. The SDAP header may include QoS flow ID information indicating QoS. The QoS information may be used as a data processing priority, scheduling information, and the like in order to support a desired service.

Main functions of the NR PDCPs 405 and 440 may include some of the following functions.

Header compression and decompression (ROHC only)
Transfer of user data
In-sequence delivery of upper-layer PDUs
Out-of-sequence delivery of upper-layer PDUs
PDCP PDU reordering for reception
Duplicate detection of lower-layer SDUs
Retransmission of PDCP SDUs
Ciphering and deciphering
Timer-based SDU discard in uplink.

Among the above functions, the reordering function of the NR PDCP devices refers to a function of rearranging PDCP PDUs received in a lower layer in order on the basis of the PDCP sequence number (SN). The reordering function of the NR PDCP devices may include a function of transmitting the data to an upper layer in the order of rearrangement or a function of immediately transmitting the data regardless of the order. In addition, the reordering function may include a function of recording lost PDCP PDUs via reordering, may include a function of reporting the state of lost PDCP PDUs to a transmitter, and may include a function of requesting retransmission of lost PDCP PDUs.

Main functions of the NR RLCs 410 and 435 may include some of the following functions.

Transfer of upper-layer PDUs
In-sequence delivery of upper-layer PDUs
Out-of-sequence delivery of upper-layer PDUs
Error Correction through ARQ
Concatenation, segmentation, and reassembly of RLC SDUs
Re-segmentation of RLC data PDUs
Reordering of RLC data PDUs
Duplicate detection Protocol error detection
RLC SDU discard
RLC re-establishment Among the above functions, the in-sequence delivery function of the NR RLC devices refers to a function of delivering RLC SDUs received from a lower layer to an upper layer in order. The in-sequence delivery function of the NR RLC devices may include a function of reassembling and delivering a plurality of RLC SDUs when one original RLC SDU is divided into the plurality of RLC SDUs to be received. The in-sequence delivery function of the NR RLC devices may include a function of rearranging received RLC PDUs on the basis of the RLC SN or the PDCP SN, may include a function of recording lost RLC PDUs via reordering, may include a function of reporting the state of lost RLC PDUs to a transmitter, and may include a function of requesting retransmission of lost RLC PDUs. If there is a lost RLC SDU, the in-sequence delivery function of the NR RLC devices may include a function of delivering only RLC SDUs before the lost RLC SDU to an upper layer in order. Further, the in-sequence delivery function of the NR RLC devices may include a function of delivering all RLC SDUs, received before a timer starts, to an upper layer in order when the timer has expired despite the presence of a lost RLC SDU. In addition, the in-sequence delivery function of the NR RLC devices may include a function of delivering all RLC SDUs received so far to an upper layer in order when the timer expires despite the presence of a lost RLC SDU. The NR RLC devices may process RLC PDUs in order of reception (regardless of the order of sequence numbers, in order of arrival) and may deliver the RLC PDUs to the PDCP devices in an out-of-sequence manner. When receiving a segment, the NR RLC devices may receive segments that are stored in a buffer or are to be received later, may reconstruct the segments into one whole RLC PDU, and may deliver the RLC PDU to the PDCP devices. The NR RLC layers may not include a concatenation function, and the concatenation function may be performed in the NR MAC layers or may be replaced with a multiplexing function of the NR MAC layers.

The out-of-sequence delivery function of the NR RLC devices refers to a function of delivering RLC SDUs received from a lower layer directly to an upper layer regardless of order. The out-of-sequence delivery function of the NR RLC devices may include a function of reassembling and delivering a plurality of RLC SDUs when one original RLC SDU is divided into the plurality of RLC SDUs to be received. In addition, the out-of-sequence delivery function of the NR RLC devices may include a function of recording lost RLC PDUs by storing and reordering the RLC SNs or PDCP SNs of received RLC PDUs.

The NR MACs 415 and 430 may be connected to a plurality of NR RLC-layer devices configured in one device, and main functions of the NR MACs may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 420 and 425 may perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

Figure 5:
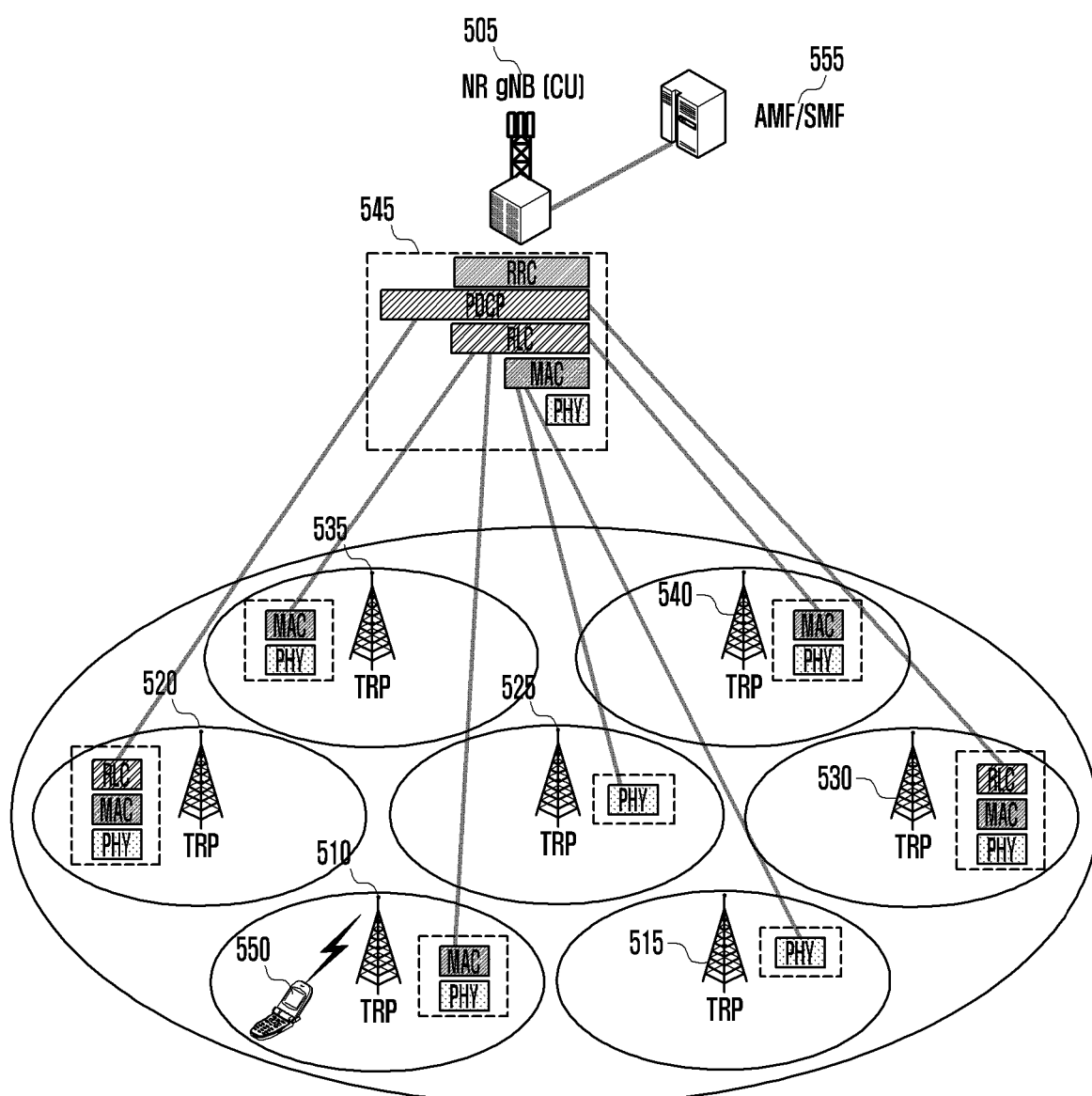
FIG. 5 illustrates a structure of a next-generation mobile communication system according to an embodiment of the disclosure.

FIG. 5 illustrates the structure of another next-generation mobile communication system according to an embodiment of the disclosure.

Referring to FIG. 5, a cell served by an NR gNB 505 operating based on a beam may include a plurality of transmission and reception points (TRPs) 510, 515, 520, 525, 530, 535, and 540. The TRPs 510, 515, 520, 525, 530, 535, and 540 refer to blocks having some functions of transmitting and receiving physical signals separated from an existing NR base station (eNB) and may include a plurality of antennas. The NR gNB 505 may be represented by a central unit (CU), and the TRPs 510, 515, 520, 525, 530, 535, and 540 may be represented by distributed units (DUs). Functions of the NR gNB 505 and the TRPs 510, 515, 520, 525, 530, 535, and 540 may be configured by separating individual PDCP/RLC/MAC/PHY layers (545). That is, the TRPs 515 and 525 may have only a PHY layer and may perform the functions of the PHY layer, and the TRPs 510, 535, and 540 may have only a PHY layer and a MAC layer and may perform the functions of the PHY and MAC layers. The TRPs 520 and 530 may have only a PHY layer, a MAC layer, and an RLC layer and may perform the functions of the PHY, MAC, and RLC layers. In particular, the TRPs 510, 515, 520, 525, 530, 535, and 540 may use a beamforming technique for transmitting and receiving data by generating narrow beams in different directions using a plurality of transmission and reception antennas. A UE 550 accesses the NR gNB 505 and an external network through the TRPs 510, 515, 520, 525, 530, 535, and 540. The NR gNB 505 supports a connection between the UE 550 and a core network (CN), particularly an AMF/SMF 555 by collecting state information, such as buffer status, available transmission power state, and channel state of the UE 550, and performing scheduling in order to provide services for users.

Figure 6:
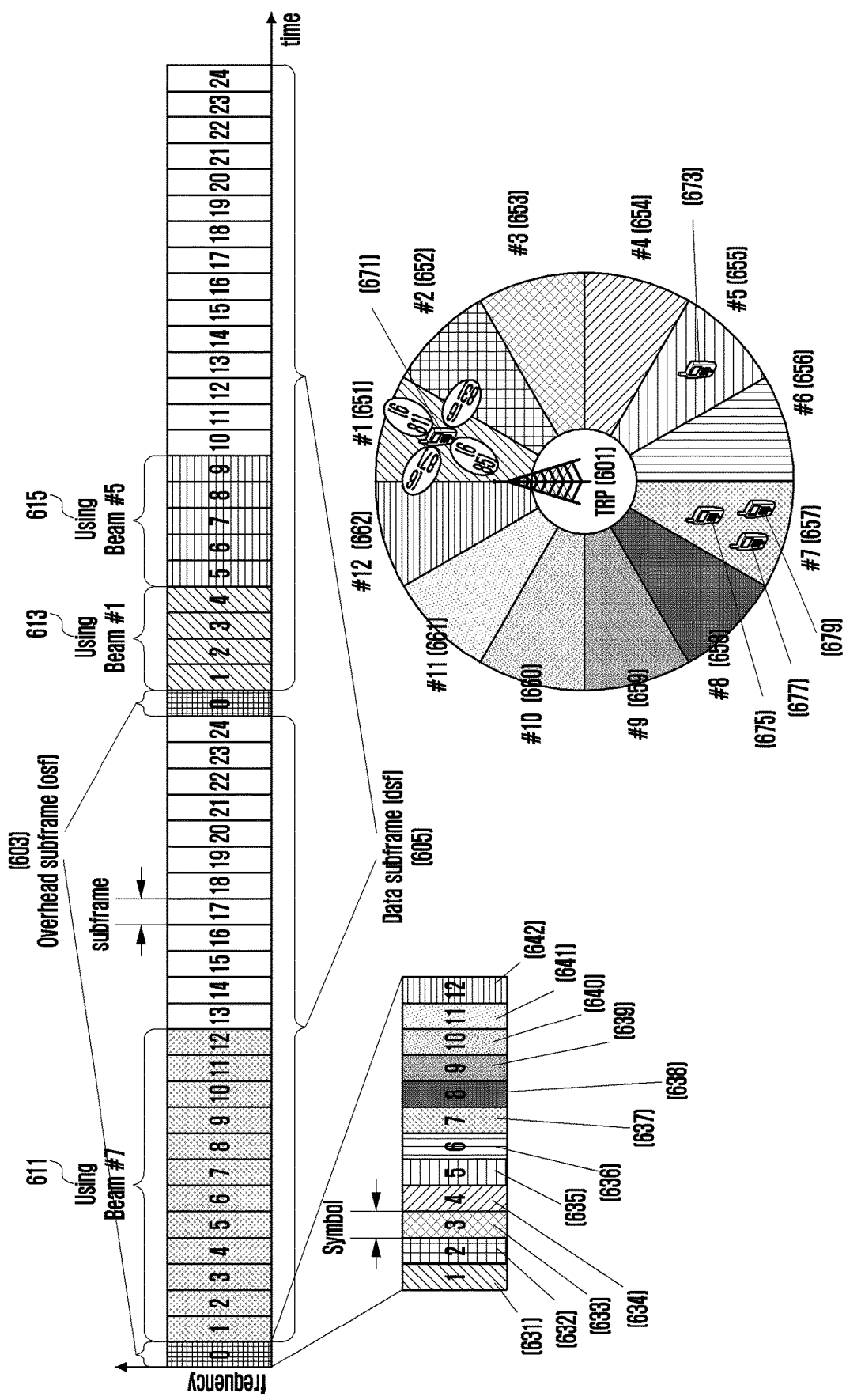
FIG. 6 illustrates a frame structure used by a new radio (NR) system according to an embodiment of the disclosure.

FIG. 6 illustrates a frame structure used by an NR system according to an embodiment of the disclosure.

The NR system aims at a higher transmission speed than that in LTE and considers a scenario of operating at a high frequency to secure a wide frequency bandwidth. In particular, the NR system considers a scenario of generating a directional beam at a high frequency and transmitting data having a high data rate to a UE.

Referring to FIG. 6, a scenario in which an NR base station or a TRP (e.g., a base station 601) uses different beams when communicating with UEs 671, 673, 675, 677, and 679 in a cell may be considered. That is, in this illustrated drawing, a scenario is assumed in which UE 1 671 uses beam #1 651 for communication, UE 2 673 uses beam #5 655 for communication, and UE 3 675, UE 4 677, and UE 5 679 use beam #7 657 for communication.

In order to measure which beam the UEs 671, 673, 675, 677, and 679 use to communicate with the TRP, an overhead subframe (hereinafter, "osf" 603) in which a common overhead signal is transmitted exists in time. The osf 603 may include a primary synchronization signal (PSS) for obtaining timing of an orthogonal frequency division multiplexing (OFDM) symbol, a secondary synchronization signal (SSS) for detecting a cell ID, and the like. In addition, the osf 603 may transmit a physical broadcast channel (PBCH) including system information, a master information block (MIB), or information essential for a UE to access the system (e.g., a bandwidth of a downlink beam, a system frame number, and the like). Further, in the osf 603, the base station 601 transmits a reference signal using a different beam for each symbol (or over a plurality of symbols). The UEs 671, 673, 675, 677, and 679 may derive a beam index value for identifying each beam from the reference signal. In this illustrated drawing, it is assumed that there are 12 beams from beam #1 651 to beam #12 662 transmitted by the base station 601 and a different beam is transmitted by sweeping per symbol in the osf 603. That is, an individual beam may be transmitted per symbol in the osf 603 (e.g., beam #1 651 is transmitted in a first symbol 631, beam #2 652 is transmitted in a second symbol 632, and the like), and the UEs 671, 673, 675, 677, and 679 may measure the osf 603 to measure a beam via which the strongest signal is transmitted among beams transmitted in the osf 603.

FIG. 6 illustrates a scenario in which the osf 603 is repeated every 25 subframes, and remaining 24 subframes are data subframes (hereinafter, "dsf" 605) in which normal data is transmitted and received. Accordingly, it is assumed that, according to scheduling by the base station 601, UE 3 675, UE 4 677, and UE 5 679 commonly use beam #7 657 to perform communication (611), UE 1 671 uses beam #1 651 to perform communication (613), and UE 2 673 uses beam #5 655 to perform communication (615). In this illustrated drawing, transmission beam #1 651 to transmission beam #12 662 of the base station 601 are mainly schematized, but reception beams of the UEs 671, 673, 675, 677, and 679 (e.g., a first reception beam 681, a second reception beam 683, a third reception beam 685, and a fourth reception beam 687 of UE 1 671) for receiving the transmission beams of the base station 601 may be further considered. In this illustrated drawing, UE 1 671 has four beams 681, 683, 685, and 687 and performs beam sweeping in order to determine which beam has the best reception performance. Here, when a plurality of beams cannot be used at the same time, as many osfs 603 as the number of reception beams may be received using one reception beam for each osf 603, thereby finding an optimal transmission beam of the base station 601 and an optimal reception beam of the UE 671.

The disclosure describes a method for reducing measurement complexity of a UE due to an increase in the number of path loss resources that can be measured through enhancement of an MIMO function and dynamically controlling measurement of various path loss resources in an existing operation of measuring a path loss resource in a next-generation mobile communication system and determining uplink transmission power in view of the path loss resource.

Generally, uplink transmission power consumption may be defined as follows.

Transmission power=Target received power+Path loss+(dynamic adjustment)

As shown above, a UE may determine uplink transmission strength as the sum of the transmission power of a downlink signal received from a base station, signal strength measured through a path loss reference signal (RS), and a dynamic adjustment having an impact in a UE RF. That is, measurement of the path loss reference signal is necessary to calculate signal strength for uplink transmission, and a configuration of a measurement resource type and a method for the measurement is included in an uplink configuration (e.g., PUSCH-Config, sounding reference signal (SRS)-Config, or the like). A specific operation will be described in detail in the following embodiments. For reference, the measurement of the path loss reference signal is an L3 measurement value (determined by the UE in view of both a previous measurement value and a current measurement value), in which a measurement window exists.

Figure 7:
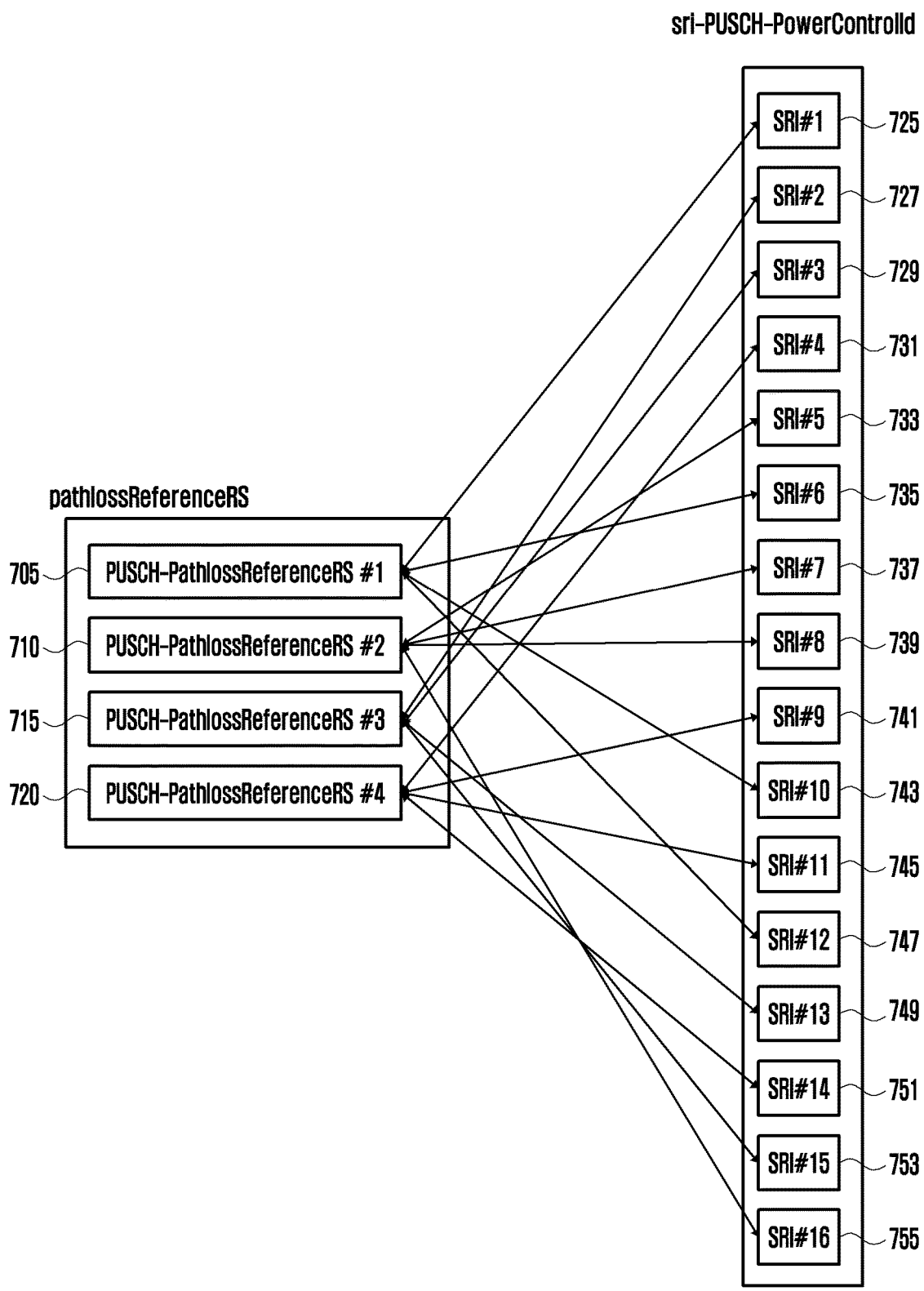
FIG. 7 illustrates a scenario of a measurement resource type and an indication for a path loss reference signal (hereinafter, "path loss reference signal (RS)") configured in a physical uplink shared channel (PUSCH) in an NR system according to an embodiment of the disclosure.

FIG. 7 illustrates a scenario of a measurement resource type and an indication for a path loss reference signal (hereinafter, "path loss RS") configured in a PUSCH in an NR system according to an embodiment of the disclosure. Particularly, this drawing illustrates an operation in an existing NR system, which may be referred to in an embodiment proposed by the disclosure.

For measurement of a path loss RS applicable to PUSCH transmission, up to four available path loss RS resources may be configured in a PUSCH-Config through a current RRC message, and a UE may measure a configured path loss RS and may apply the path loss RS to PUSCH transmission. That is, the UE determines PUSCH transmission power considering a path loss RS measurement value. An operation of configuring and applying a path loss RS used for PUSCH transmission is as follows.

1. A path loss RS and mapping information used to indicate a path loss RS applied to actual PUSCH transmission may be provided to the UE through an RRC configuration.

PUSCH-PathlossReferenceRS: Up to four path loss RSs are configured

Index of a path loss RS

Configured as either a CSI-RS resource or an SSB resource

The UE performs measurement on configured path loss RSs.

SRI-PUSCH-PowerControl: Mapping with a path loss RS used for actual PUSCH transmission that can be indicated through an SRS resource indicator (SRI) bit of downlink control information (DCI) is configured (up to 16 mappings)

Index information used to indicate an SRI of PUSCH transmission

Index of a path loss RS associated with an SRI index

Specific power configuration (sri-P0-PUSCH-AlphaSetId and sri-PUSCH-ClosedLoopIndex)

The path loss RS may be configured as below in Table 1.

TABLE 1

| | | |
|---|---|---|
| PUSCH-PowerControl ::= | SEQUENCE { | |
| tpc-Accumulation | | ENUMERATED { disabled } |
| OPTIONAL, -- Need S | | |
| msg3-Alpha | Alpha | OPTIONAL, |
| -- Need S | | |
| p0-NominalWithoutGrant | | INTEGER (−202..24) |
| OPTIONAL, -- Need M | | |
| p0-AlphaSets | SEQUENCE (SIZE (1..maxNrofP0-PUSCH-AlphaSets)) OF | |
| P0-PUSCH-AlphaSet | OPTIONAL, -- Need M | |

TABLE 1-continued

```
  pathlossReferenceRSToAddModList              SEQUENCE (SIZE (1..maxNrofPUSCH-
PathlossReferenceRSs)) OF PUSCH-PathlossReferenceRS
                                                                        OPTIONAL, -- Need
N
  pathlossReferenceRSToReleaseList             SEQUENCE (SIZE (1..maxNrofPUSCH-
PathlossReferenceRSs)) OF PUSCH-PathlossReferenceRS-Id
                                                                        OPTIONAL, -- Need
N
  twoPUSCH-PC-AdjustmentStates                           ENUMERATED {twoStates}
OPTIONAL, -- Need S
    deltaMCS         ENUMERATED {enabled}                                OPTIONAL,
-- Need S
  sri-PUSCH-MappingToAddModList       SEQUENCE (SIZE (1..maxNrofSRI-PUSCH-
Mappings)) OF SRI-PUSCH-PowerControl
OPTIONAL, -- Need
N
  sri-PUSCH-MappingToReleaseList      SEQUENCE (SIZE (1..maxNrofSRI-PUSCH-
Mappings)) OF SRI-PUSCH-PowerControlId
                                                                        OPTIONAL -- Need
N
}
P0-PUSCH-AlphaSet ::=           SEQUENCE {
  p0-PUSCH-AlphaSetId P0-PUSCH-AlphaSetId,
  p0              INTEGER (-16..15)                                     OPTIONAL,
-- Need S
  alpha           Alpha                                                 OPTIONAL --
Need S
}
P0-PUSCH-AlphaSetId ::=        INTEGER (0..maxNrofP0-PUSCH-AlphaSets-1)
PUSCH-PathlossReferenceRS ::=         SEQUENCE {
  pusch-PathlossReferenceRS-Id       PUSCH-PathlossReferenceRS-Id,
  referenceSignal             CHOICE {
    ssb-Index                 SSB-Index,
    csi-RS-Index              NZP-CSI-RS-ResourceId
  }
}
PUSCH-PathlossReferenceRS-Id          ::=              INTEGER (0..maxNrofPUSCH-
PathlossReferenceRSs-1)
SRI-PUSCH-PowerControl ::=           SEQUENCE {
  sri-PUSCH-PowerControlId           SRI-PUSCH-PowerControlId,
  sri-PUSCH-PathlossReferenceRS-Id        PUSCH-PathlossReferenceRS-Id,
  sri-P0-PUSCH-AlphaSetId            P0-PUSCH-AlphaSetId,
  sri-PUSCH-ClosedLoopIndex           ENUMERATED { i0, i1 }
}
SRI-PUSCH-PowerControlId ::=          INTEGER (0..maxNrofSRI-PUSCH-Mappings-1)
```

2. A specific path loss RS used for PUSCH transmission (based on a codebook or a non-codebook) may be indicated to the UE via an SRI in DCI format 0_1, which is for specifying one path loss RS that is actually applied although the UE measures up to four path loss RSs in phase 1.

Referring to FIG. 7, as in phase 1, configurations of up to four path loss RSs that can be configured particularly through PUSCH-PathlossReferenceRS in PUSCH-Config of the RRC message may be indicated (705, 710, 715, and 720). In addition, path loss RSs associated with 16 SRIs that can be configured particularly through SRI-PUSCH-Power-Control in PUSCH-Config of the RRC message may be indicated (725, 727, 729, 731, 733, 735, 737, 739, 741, 743, 745, 747, 749, 751, 753, and 755). Mapping between the SRIs and the path loss RSs configured through the RRC message is configured, and one path loss RS used for actual PUSCH transmission is indicated via an SRI through DCI. There is no restriction on mapping between the SRIs and the path loss RSs except that up to four path loss RSs can be configured.

Figure 8:
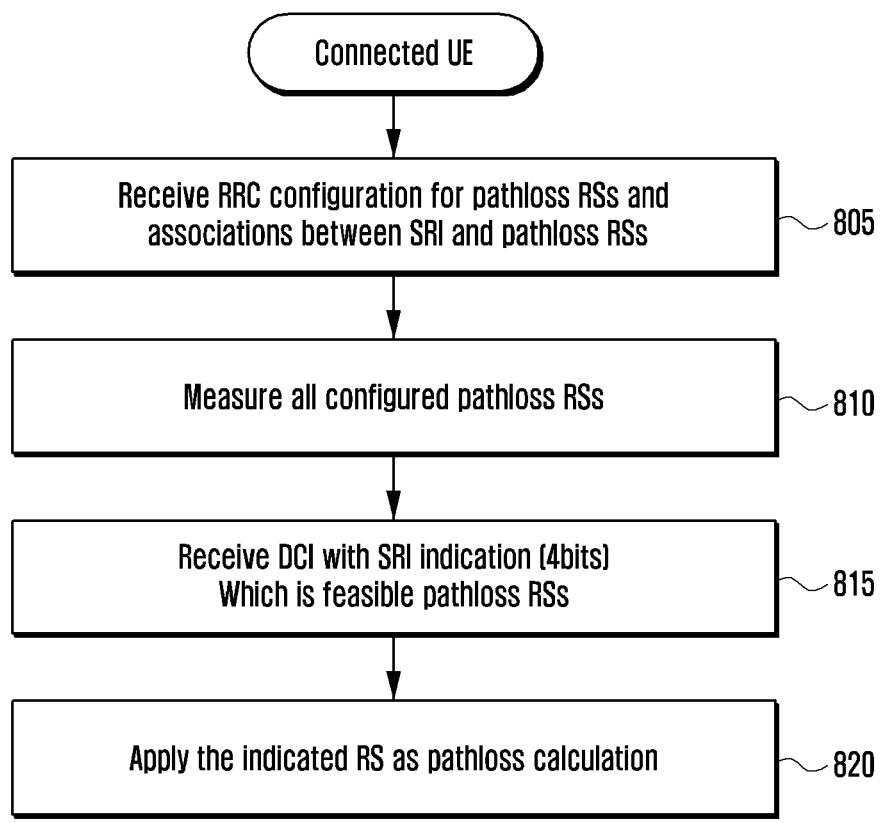
FIG. 8 illustrates an overall operation of a UE for a measurement resource type and an indication for a path loss RS configured in a PUSCH in an NR system according to an embodiment of the disclosure.

FIG. 8 illustrates an overall operation of a UE for a measurement resource type and an indication for a path loss RS configured in a PUSCH in an NR system according to an embodiment of the disclosure.

Referring to FIG. 8, an operation in an existing NR system, which may be referred to in an embodiment proposed by the disclosure.

In an RRC-connected state, a UE receives PUSCH configuration information, in operation 805, and the configuration information may provide path loss RS configuration information required to determine signal strength and power for PUSCH transmission and configuration information about an association between an SRI and a path loss RS. Specific configuration information and a specific operation have been described in detail with reference to FIG. 7. In operation 810, the UE performs L3 measurement on up to four path loss RS resources configured in operation 805 and stores and manages measurement values. In operation 815, when a base station indicates scheduling for uplink transmission (PUSCH) of the UE, the base station may indicate not only scheduling resource information but also a specific path loss RS applied to calculation of signal strength and power for the transmission through DCI, and the UE may receive the DCI. That is, the base station may indicate the path loss RS mapped with an SRI of the DCI, and the UE may measure a corresponding path loss RS resource and may calculate path loss. In operation 820, the UE may determine power for a PUSCH transmission signal considering the pass loss.

Figure 9:
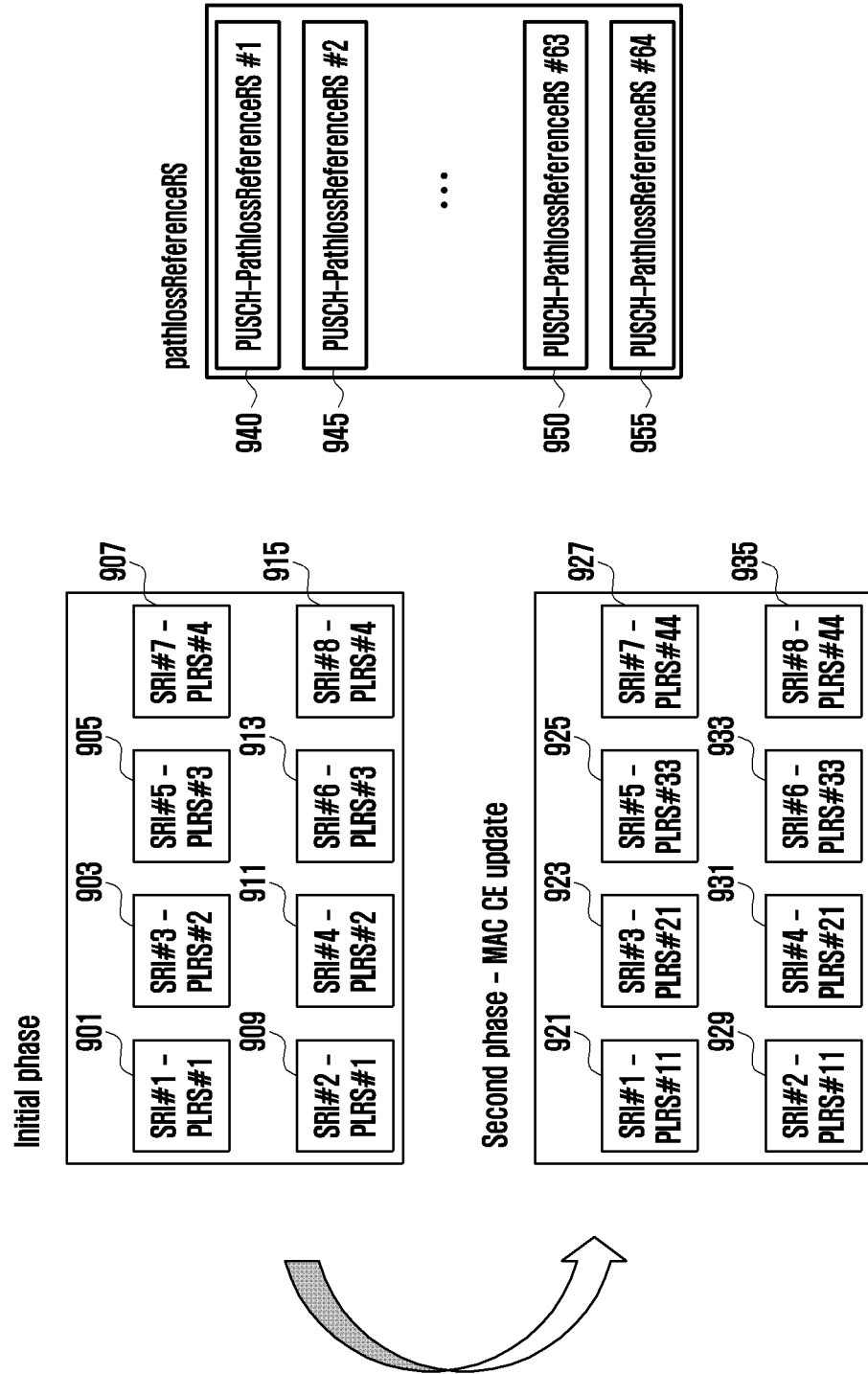
FIG. 9 illustrates a scenario of a measurement resource type, dynamic mapping updating, and a valid resource indication for a plurality of path loss RSs configured in a PUSCH in an NR system according to an embodiment of the disclosure.

FIG. 9 illustrates a scenario of a measurement resource type, dynamic mapping updating, and a valid resource indication for a plurality of path loss RSs configured in a PUSCH in an NR system according to an embodiment of the disclosure.

For measurement of a path loss RS applied to PUSCH transmission, a base station may configure up to 64 path loss RS resources for a UE in PUSCH-Config through an RRC message, and the UE may measure up to four path loss RS resources among configured path loss RSs and may apply the measurement to PUSCH transmission. That is, the UE calculates PUSCH transmission power in view of a path loss RS measurement value. To this end, there is a need for a method for indicating a resource initially measured by the UE (up to four resources) even though the base station configures up to 64 path loss RS resources for the UE through an RRC configuration. This method is described below. An operation of configuring and applying a path loss RS used for PUSCH transmission is as follows.

1. A path loss RS and mapping information used to indicate a path loss RS applied to actual PUSCH transmission may be provided to the UE through an RRC configuration.
    PUSCH-PathlossReferenceRS: Up to 64 path loss RSs are configured
    Index of a path loss RS
    Configured as either a CSI-RS resource or an SSB resource
    SRI-PUSCH-PowerControl: Mapping with a path loss RS used for actual PUSCH transmission that can be indicated through an SRI bit of downlink control information (DCI) is configured (up to 16 mappings)
    Index information used to indicate an SRI of PUSCH transmission
    Index of a path loss RS associated with an SRI index
    Specific power configuration (sri-P0-PUSCH-Alpha-SetId and sri-PUSCH-ClosedLoopIndex)
    The above pieces of information are included in a dynamic mapping update through the following MAC CE
    Since the UE can measure up to four path loss RSs, the number of sri-PUSCH-PathlossReferenceRS-Ids associated with all sri-PUSCH-PowerControlIds is limited to up to four
    Method for configuring an initially measured path loss RS through an RRC configuration
    Method 1: An existing list is used for up to four path loss RSs to be initially measured, and actual measurement may be performed for a list for configuring up to 60 path loss RSs to be newly added only when the list is updated through the MAC CE
    Method 2: Up to 64 path loss RSs are configured, and up to four path loss RSs to be actually measured are limited to path loss RS resources associated with SRIs configured in SRI-PUSCH-PowerControl, that is, sri-PUSCH-PathlossReferenceRS-Id. This limitation is applied even when information about mapping between the SRIs and the path loss RSs is updated through the MAC CE Table 2 and Table 3 are examples for reference in the above description.

TABLE 2

```
PUSCH-Config ::=                    SEQUENCE {
    dataScramblingIdentityPUSCH             INTEGER (0..1023)
OPTIONAL, -- Need S
    txConfig                    ENUMERATED {codebook, nonCodebook}
OPTIONAL, -- Need S
    dmrs-UplinkForPUSCH-MappingTypeA            SetupRelease { DMRS-UplinkConfig }
OPTIONAL, -- Need M
    dmrs-UplinkForPUSCH-MappingTypeB            SetupRelease { DMRS-UplinkConfig }
OPTIONAL, -- Need M
    pusch-PowerControl              PUSCH-PowerControl
OPTIONAL, -- Need M
    frequencyHopping            ENUMERATED {intraSlot, interSlot}
OPTIONAL, -- Need S
    frequencyHoppingOffsetLists         SEQUENCE (SIZE (1..4)) OF INTEGER (1..
maxNrofPhysicalResourceBlocks-1)
                                    OPTIONAL, --
Need M
    resourceAllocation          ENUMERATED { resourceAllocationType0,
resourceAllocationType1, dynamicSwitch},
    pusch-TimeDomainAllocationList              SetupRelease { PUSCH-
TimeDomainResourceAllocationList }             OPTIONAL, -- Need M
    pusch-AggregationFactor             ENUMERATED { n2, n4, n8 }
OPTIONAL, -- Need S
    mcs-Table                   ENUMERATED {qam256, qam64LowSE}
OPTIONAL, -- Need S
    mcs-TableTransformPrecoder              ENUMERATED {qam256, qam64LowSE}
OPTIONAL, -- Need S
    transformPrecoder           ENUMERATED {enabled, disabled}
OPTIONAL, -- Need S
    codebookSubset          ENUMERATED {fullyAndPartialAndNonCoherent,
partialAndNonCoherent,nonCoherent}
                                    OPTIONAL, -- Cond
codebookBased
    maxRank             INTEGER (1..4)                  OPTIONAL, -
- Cond codebookBased
    rbg-Size            ENUMERATED { config2}
OPTIONAL, -- Need S
    uci-OnPUSCH                 SetupRelease { UCI-OnPUSCH}
```

TABLE 2-continued

```
OPTIONAL, -- Need M
  tp-pi2BPSK                    ENUMERATED {enabled}
OPTIONAL, -- Need S
  ...,
  [[ pusch-PowerControl-v16xx    PUSCH-PowerControl-v16xx
OPTIONAL, -- Need M
  ]]
}
```

TABLE 3

```
PUSCH-PowerControl ::=              SEQUENCE {
  tpc-Accumulation                  ENUMERATED { disabled }
OPTIONAL, -- Need S
  msg3-Alpha                        Alpha
OPTIONAL, -- Need S
  p0-NominalWithoutGrant                            INTEGER (-202..24)
OPTIONAL, -- Need M
  p0-AlphaSets                      SEQUENCE (SIZE (1..maxNrofP0-PUSCH-AlphaSets))
OF P0-PUSCH-AlphaSet         OPTIONAL, -- Need M
  pathlossReferenceRSToAddModList                   SEQUENCE (SIZE (1..maxNrofPUSCH-
PathlossReferenceRSs)) OF PUSCH-PathlossReferenceRS
                                                      OPTIONAL, -- Need
N
  pathlossReferenceRSToReleaseList                  SEQUENCE (SIZE (1..maxNrofPUSCH-
PathlossReferenceRSs)) OF PUSCH-PathlossReferenceRS-Id
                                                      OPTIONAL, --
Need N
  twoPUSCH-PC-AdjustmentStates      ENUMERATED {twoStates}
OPTIONAL, -- Need S
  deltaMCS              ENUMERATED {enabled}
OPTIONAL, -- Need S
  sri-PUSCH-MappingToAddModList                     SEQUENCE (SIZE (1..maxNrofSRI-PUSCH-
Mappings)) OF SRI-PUSCH-PowerControl
                                                      OPTIONAL, -- Need
N
  sri-PUSCH-MappingToReleaseList                    SEQUENCE (SIZE (1..maxNrofSRI-PUSCH-
Mappings)) OF SRI-PUSCH-PowerControlId
                                                      OPTIONAL -- Need
N
}
  PUSCH-PowerControl-v16xx ::=      SEQUENCE {
    pathlossReferenceRSToAddModListExt   SEQUENCE (SIZE (1..maxNrofPUSCH-
PathlossReferenceRSsExt)) OF PUSCH-PathlossReferenceRS
                                                      OPTIONAL, -- Need
N
    pathlossReferenceRSToReleaseListExt  SEQUENCE (SIZE (1..maxNrofPUSCH-
PathlossReferenceRSsExt)) OF PUSCH-PathlossReferenceRS-IdExt
                                                      OPTIONAL, --
Need N
}
P0-PUSCH-AlphaSet ::=               SEQUENCE {
  p0-PUSCH-AlphaSetId               P0-PUSCH-AlphaSetId,
  p0                INTEGER (-16..15)
OPTIONAL, -- Need S
  alpha             Alpha                                              OPTIONAL --
Need S
}
  SRI-PUSCH-PowerControl ::=        SEQUENCE {
  sri-PUSCH-PowerControlId          SRI-PUSCH-PowerControlId,
  sri-PUSCH-PathlossReferenceRS-Id              PUSCH-PathlossReferenceRS-Id,
  sri-P0-PUSCH-AlphaSetId           P0-PUSCH-AlphaSetId,
  sri-PUSCH-ClosedLoopIndex         ENUMERATED { i0, i1 }
}
P0-PUSCH-AlphaSetId ::=             INTEGER (0..maxNrofP0-PUSCH-AlphaSets-1)
P0-PUSCH-AlphaSetIdExt ::=          INTEGER (4..maxNrofP0-PUSCH-AlphaSetsExt-1)
```

2. The UE needs to dynamically perform measurement through the MAC CE updating the mapping between the path loss RSs and the SRIs, and a path loss RS may be indicated by an SRI. A specific MAC CE structure and operation method will be described in detail below in the disclosure.

3. A specific path loss RS used for PUSCH transmission (based on a codebook or a non-codebook) may be indicated via an SRI in DCI format 0_1, which is for specifying one path loss RS that is actually applied although the UE measures up to four path loss RSs in phases 1 and 2.

Referring to FIG. 9, as in phase 1, 940, 945, 950, and 955 indicate configurations of up to 64 path loss RSs that can be configured particularly through PUSCH-PathlossReferenceRS in PUSCH-Config of the RRC message. As illustrated,

901, 903, 905, 907, 909, 911, 913, and 915 indicate a mapping relationship of path loss RSs associated with SRIs that can be initially configured particularly through SRI-PUSCH-PowerControl in PUSCH-Config of the RRC message. Mapping between the SRIs and the path loss RSs configured through the RRC message is configured, and one path loss RS used for actual PUSCH transmission is indicated via an SRI through DCI. There is no restriction on mapping between the SRIs and the path loss RSs except that up to four path loss RSs can be configured. Subsequently, a path loss RS to be measured may be updated through the MAC CE for updating mapping between the path loss RSs and the SRIs, and a relationship between the path loss RSs and the SRIs is indicated by 921, 923, 925, 927, 929, 931, 933, and 935.

A specific example is illustrated below. Eight pieces of SRI mapping information may be initially configured through the RRC message, each of which has a mapping relationship with a path loss RS as follows.

SRI #1 is associated with path loss RS #1
SRI #2 is associated with path loss RS #1
SRI #3 is associated with path loss RS #2
SRI #4 is associated with path loss RS #2
SRI #5 is associated with path loss RS #3
SRI #6 is associated with path loss RS #3
SRI #7 is associated with path loss RS #4
SRI #8 is associated with path loss RS #4

Subsequently, the mapping relationship between the SRIs and the path loss RSs is updated as follows by receiving the MAC CE.

SRI #1 is associated with path loss RS #11
SRI #2 is associated with path loss RS #11
SRI #3 is associated with path loss RS #21
SRI #4 is associated with path loss RS #21
SRI #5 is associated with path loss RS #33
SRI #6 is associated with path loss RS #33
SRI #7 is associated with path loss RS #44
SRI #8 is associated with path loss RS #44

Introducing dynamic updating of mapping between the SRIs and the path loss RSs described above may replace an existing procedure of updating an RRC configuration, making it possible to change configuration information with a low delay.

Figure 10:
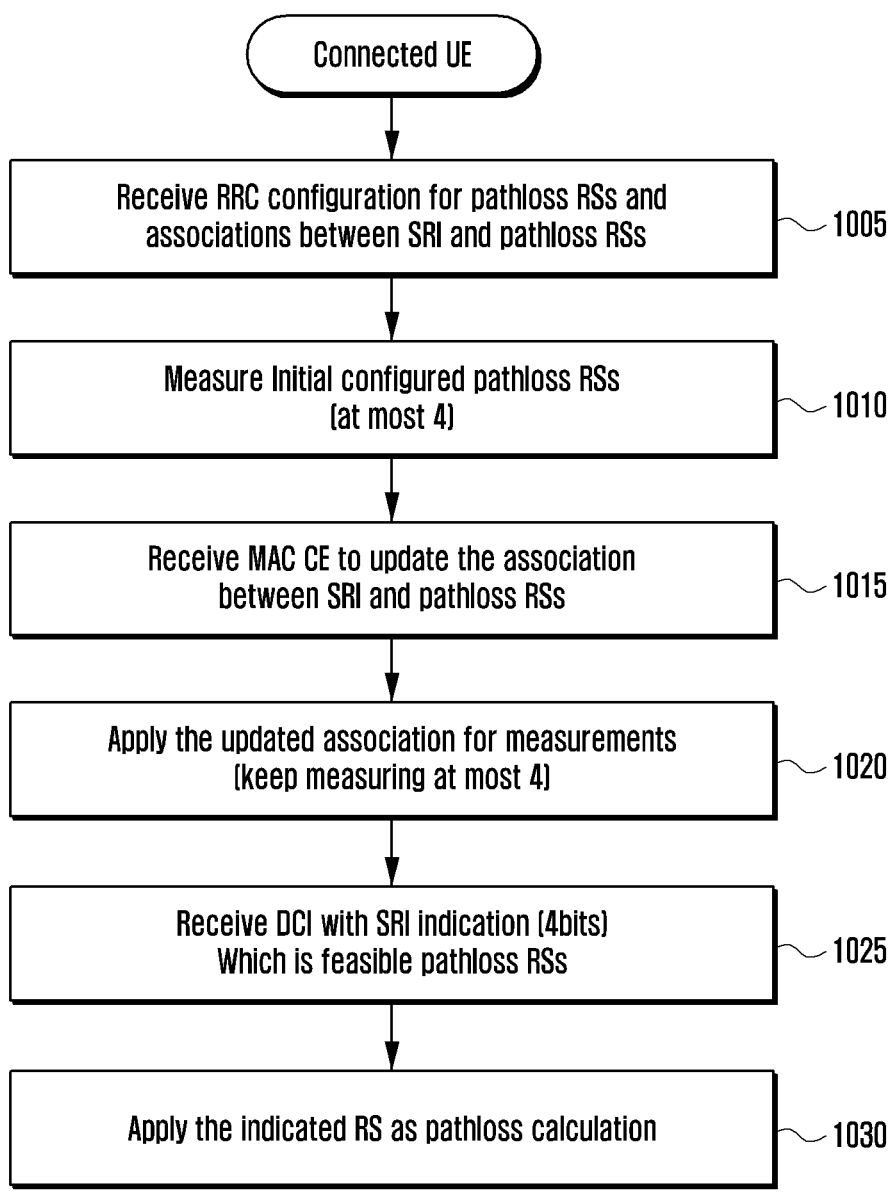
FIG. 10 illustrates an overall UE operation for a measurement resource type, dynamic mapping updating, and a valid resource indication for a plurality of path loss RSs configured in a PUSCH according to an embodiment of the disclosure.

FIG. 10 illustrates an overall UE operation for a measurement resource type, dynamic mapping updating, and a valid resource indication for a plurality of path loss RSs configured in a PUSCH according to an embodiment of the disclosure.

Referring to FIG. 10, a UE in an RRC-connected state may receive PUSCH configuration information in operation 1005, and the configuration information may provide path loss RS configuration information required to determine signal strength and power for PUSCH transmission and configuration information about an association between an SRI and a path loss RS. In particular, information about a path loss RS associated with an SRI that can be initially configured particularly through SRI-PUSCH-PowerControl in PUSCH-Config of an RRC message may be configured. Mapping between SRIs and path loss RSs configured through the RRC message may be configured, and one path loss RS used for actual PUSCH transmission may be indicated via an SRI through DCI. There is no restriction on mapping between the SRIs and the path loss RSs except that up to four path loss RSs can be configured. Specific configuration information and a specific operation have been described in detail with reference to FIG. 9.

In operation 1010, the UE may perform L3 measurement on up to four path loss RS resources requiring initial measurement, configured in operation 1005, and may store and manage measurement values. In operation 1015, the UE may receive a path loss RS update MAC CE for updating the mapping between the path loss RSs and the SRIs through a base station and may update and manage information about the relationship between the path loss RSs and the SRIs using information indicated by the MAC CE. In operation 1015, the UE may measure a path loss RS according to a previous mapping rule for a specific time (transition time), and may measure and reflect a path loss RS configured in a newly changed mapping rule after the predetermined specific time (transition time). This is because path loss RS measurement is based on L3 measurement, and thus a measurement value cannot be changed immediately through the MAC CE, and the average value needs to be calculated by applying previous measurement values. A specific structure and information of the MAC CE and a specific operation will be described in more detail in the following embodiments. In particular, two methods may be considered in relation to an MAC CE structure for path loss RS updating.

First MAC CE mapping method for path loss RS updating (described in FIG. 11): Method of indicating a plurality of SRI indexes to which one path loss RS is applied Second MAC CE mapping method for path loss RS updating (described in FIG. 12): Method of indicating SRI indexes to which a plurality of path loss RSs is respectively applied In these two methods, a condition is also required that the total sum of path loss RSs associated with an SRI is limited to four. This is because the UE can measure and manage only up to four path loss RSs. That is, in operation 1020, the UE may measure and manage up to four path loss RSs based on the information updated in operation 1015.

In operation 1025, the UE may receive scheduling for uplink transmission (PUSCH) from the base station through DCI, and the control information may indicate not only scheduling resource information but also a specific path loss RS applied to calculation of signal strength and power for the transmission. That is, the path loss RS mapped with an SRI of the DCI may be indicated, and the UE may measure a corresponding path loss RS resource and may calculate path loss. In operation 1030, the UE may determine power for a PUSCH transmission signal considering the pass loss.

Figure 11:
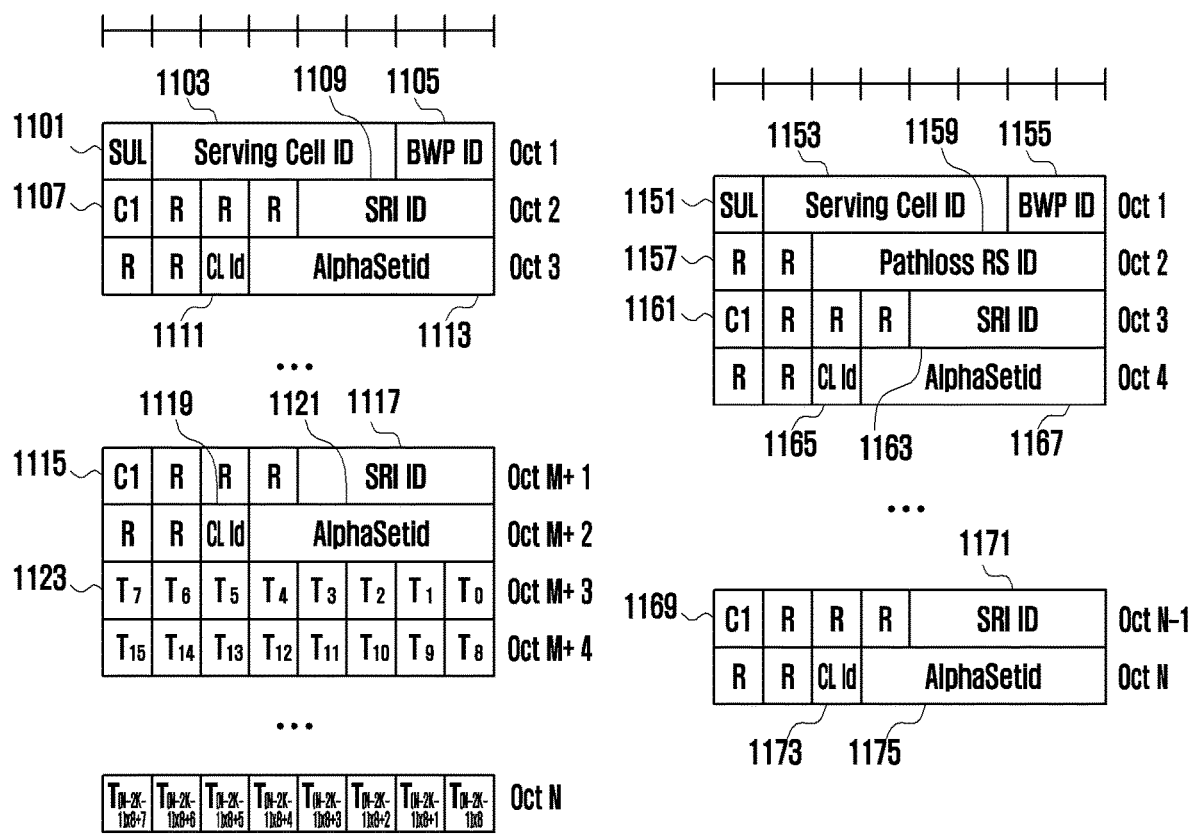
FIG. 11 illustrates a first MAC CE and a first mapping method for dynamic updating of a path loss RS requiring measurement according to an embodiment of the disclosure.

FIG. 11 illustrates a first MAC CE and a first mapping method for dynamic updating of a path loss RS requiring measurement according to an embodiment of the disclosure.

Referring to FIG. 11, a plurality of SRI indexes to which one path loss RS is applied. To indicate updating of a plurality of path loss RSs, a plurality of MAC CEs needs to be transmitted. A new downlink MAC CE which has not previously existed needs to be introduced, and a new LCID may be allocated. The disclosure proposes option 1 of indicating a path loss RS in a bitmap and option 2 of directly indicating a path loss RS index, and specific MAC CE structures and related fields may be as follows.

1. Option 1: Method of indicating a path loss RS index based on a bitmap

Supplementary uplink (SUL) indicator 1101: Indicates an uplink type, 1 bit

Serving cell ID 1103: Serving cell index, 5 bits

Bandwidth part (BWP) ID 1105: BWP index, 2 bits, A specific group index indicated by an RRC configuration may be indicated instead of the serving cell index and the BWP index Indicator indicating whether there is a plurality of SRI IDs (C1) 1107 and 1115: Indicates whether there is an additional SRI ID associated with a path loss RS 1123 subsequently indicated through 1 bit SRI ID 1109 and 1117: Index of an SRI associated with a path loss RS, 4 bits Closed loop index (CLId) 1111 and 1119: Optionally included or may not be included, Used to identify a closed loop index, 1 bit Alpha value index (AlphaSetId) 1113 and 1121: Optionally included or may not be included, Forwards an index corresponding to a specific alpha value for transmission power adjustment, 5 bits Path loss RS index 1123: Indicates the index of one path loss RS among up to 64 path loss RSs in a bitmap, 8 bytes, only one bit can be set to 1

2. Option 2: Method of directly indicating a path loss RS index

SUL (supplementary uplink) indicator 1151: Indicates an uplink type, 1 bit

Serving cell ID 1153: Serving cell index, 5 bits

BWP ID 1155: BWP index, 2 bits, A specific group index indicated by an RRC configuration may be indicated instead of the serving cell index and the BWP index Reserved bit 1157

Path loss RS index 1159: Path loss RS index, 5 bits, Indicates a path loss resource associated with an SRI signaled below Indicator indicating whether there is a plurality of SRI IDs (C1) 1161 and 1169: Indicates whether there is an additional SRI ID associated with a path loss RS 1159 indicated by a corresponding MAC CE through 1 bit SRI ID 1163 and 1171: Index of an SRI associated with a path loss RS, 4 bits Closed loop index (CLId) 1165 and 1173: Optionally included or may not be included, Used to identify a closed loop index, 1 bit Alpha value index (AlphaSetId) 1167 and 1175: Optionally included or may not be included, Forwards an index corresponding to a specific alpha value for transmission power adjustment, 5 bits FIG. 12 illustrates a second MAC CE and a second mapping method for dynamic updating of a path loss RS requiring measurement according to an embodiment of the disclosure.

Figure 12:
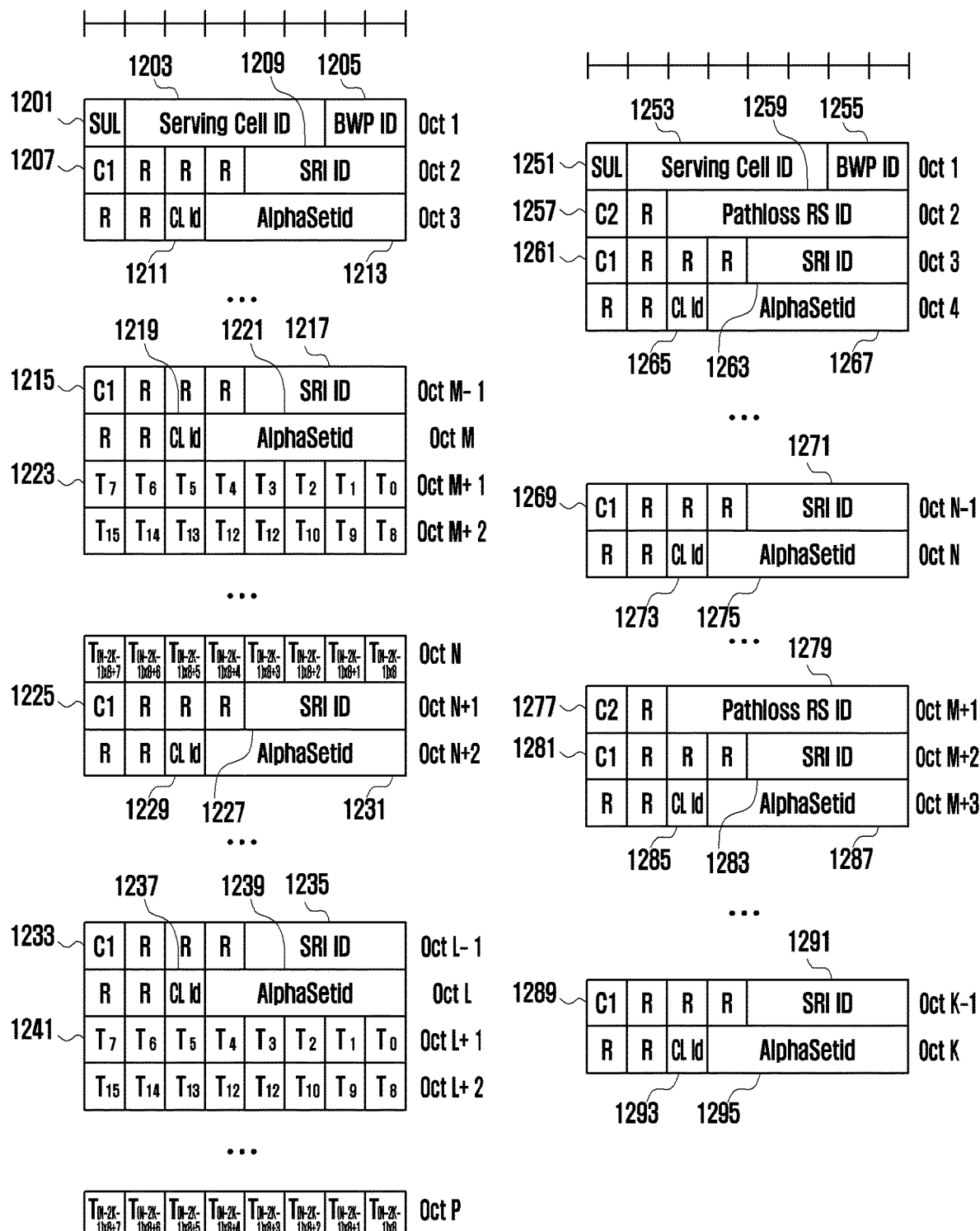
FIG. 12 illustrates a second MAC CE and a second mapping method for dynamic updating of a path loss RS requiring measurement according to an embodiment of the disclosure.

Referring to FIG. 12, is characterized in that mapping information about a plurality of SRI indexes to which one path loss RS is applied indicates that a plurality of sets is simultaneously updated. That is, to indicate updating of a plurality of path loss RSs, rather than requiring transmission of a plurality of MAC CEs as in FIG. 11, a plurality of path loss RSs is indicated through one MAC CE and mapping information about an SRI associated with the path loss RSs is provided. A new downlink MAC CE which has not previously existed needs to be introduced, and a new LCID may be allocated. The disclosure proposes option 1 of indicating a path loss RS in a bitmap and option 2 of directly indicating a path loss RS index, and specific MAC CE structures and related fields may be as follows.

1. Option 1: Method of indicating a path loss RS index based on a bitmap

SUL (supplementary uplink) indicator 1201: Indicates an uplink type, 1 bit

Serving cell ID 1203: Serving cell index, 5 bits

BWP ID 1205: BWP index, 2 bits, A specific group index indicated by an RRC configuration may be indicated instead of the serving cell index and the BWP index.

Indicator indicating whether there is a plurality of SRI IDs (C1) 1207, 1215, 1225, and 1233: Indicates whether there is an additional SRI ID associated with a path loss RS 1223 subsequently indicated through 1 bit SRI ID 1209, 1217, 1227, and 1235: Index of an SRI associated with a path loss RS, 4 bits Closed loop index (CLId) 1211, 1219, 1229, and 1237: Optionally included or may not be included, Used to identify a closed loop index, 1 bit Alpha value index (AlphaSetId) 1213, 1221, 1231, and 1239: Optionally included or may not be included, Forwards an index corresponding to a specific alpha value for transmission power adjustment, 5 bits Path loss RS index 1223 and 1241: Indicates the index of one path loss RS among up to 64 path loss RSs in a bitmap, 8 bytes, only one bit can be set to 1

2. Option 2: Method of directly indicating a path loss RS index

Supplementary uplink (SUL) indicator 1251: Indicates an uplink type, 1 bit

Serving cell ID 1253: Serving cell index, 5 bits

BWP ID 1255: BWP index, 2 bits, A specific group index indicated by an RRC configuration may be indicated instead of the serving cell index and the BWP index Indicator for updating of a plurality of path loss RSs (C2) 1257 and 1277: Indicates that there is additional mapping information about one path loss RS and an SRI, 1 bit Path loss RS index 1259: Path loss RS index, 5 bits, Indicates a path loss resource associated with an SRI signaled below Indicator indicating whether there is a plurality of SRI IDs (C1) 1261, 1269, 1281, and 1289: Indicates whether there is an additional SRI ID associated with a path loss RS 1159 indicated by a corresponding MAC CE through 1 bit SRI ID 1263, 1271, 1283, and 1291: Index of an SRI associated with a path loss RS, 4 bits Closed loop index (CLId) 1265, 1273, 1285, and 1293: Optionally included or may not be included, Used to identify a closed loop index, 1 bit Alpha value index (AlphaSetId) 1267, 1275, 1287, and 1295: Optionally included or may not be included, Forwards an index corresponding to a specific alpha value for transmission power adjustment, 5 bits FIG. 13 illustrates an overall UE operation for a measurement resource type and dynamic resource indication for a path loss RS configured in SRS transmission according to an embodiment of the disclosure.

Figure 13:
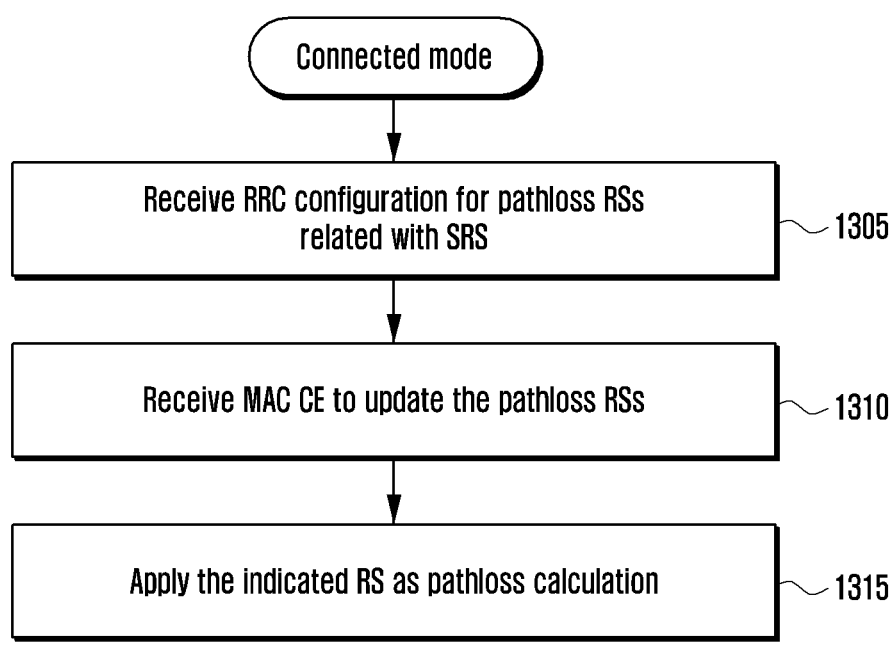
FIG. 13 illustrates an overall UE operation for a measurement resource type and dynamic resource indication for a path loss RS configured in a sound reference signal (SRS) transmission according to an embodiment of the disclosure.

Referring to FIG. 13, a UE in an RRC-connected state may receive configuration information about an SRS resource in operation 1305, and the configuration information may provide path loss RS configuration information required to determine signal strength and power for SRS resource transmission. In particular, path loss RS configuration information applied to one SRS resource set may be provided to the UE through SRS-ResourceSet in SRS-Config of an RRC message. Although one path loss RS is configured via RRC, up to 64 resources may be configured. Table 4 relates to a path loss RS configuration method for SRS transmission based on Rel-15, and a plurality of path loss RS configurations may be subsequently added in SRS-ResourceSet in an extended manner. Further, it is necessary to indicate an initial path loss resource requiring initial measurement. In one example, a previously used field may be used as an initial value, and an extended path loss RS configuration may be used for dynamic resource updating through a MAC CE.

ther, it is necessary to indicate an initial path loss resource requiring initial measurement. In one example, a previously used field may be used as an initial value, and an extended path loss RS configuration may be used for dynamic resource updating through an MAC CE. Subsequently, when it is necessary to update a resource for measuring a path loss RS which is applied to SRS transmission and is needed to

TABLE 4

```
SRS-ResourceSet ::=                         SEQUENCE {
    srs-ResourceSetId                       SRS-ResourceSetId,
    srs-ResourceIdList                      SEQUENCE (SIZE(1..maxNrofSRS-ResourcesPerSet))
OF SRS-ResourceId       OPTIONAL, -- Cond Setup
    resourceType                    CHOICE {
        aperiodic                   SEQUENCE {
            aperiodicSRS-ResourceTrigger                    INTEGER (1..maxNrofSRS-TriggerStates-
1),
            csi-RS                  NZP-CSI-RS-ResourceId
OPTIONAL, -- Cond NonCodebook
            slotOffset              INTEGER (1..32)                                 OPTIONAL,
-- Need S
            ...,
            [[
            aperiodicSRS-ResourceTriggerList-v1530          SEQUENCE (SIZE(1..maxNrofSRS-
TriggerStates-2))
                                    OF INTEGER (1..maxNrofSRS-TriggerStates-1)
OPTIONAL -- Need M
            ]]
        },
        semi-persistent             SEQUENCE {
            associatedCSI-RS                        NZP-CSI-RS-ResourceId
OPTIONAL, -- Cond NonCodebook
            ...
        },
        periodic                    SEQUENCE {
            associatedCSI-RS                        NZP-CSI-RS-ResourceId
OPTIONAL, -- Cond NonCodebook
            ...
        }
    },
    usage                   ENUMERATED {beamManagement, codebook,
nonCodebook, antennaSwitching},
    alpha                   Alpha                                   OPTIONAL, -- Need
S
    p0                      INTEGER (-202..24)                              OPTIONAL, -
- Cond Setup
    pathlossReferenceRS                     CHOICE {
        ssb-Index                   SSB-Index,
        csi-RS-Index                NZP-CSI-RS-ResourceId
    }                                                               OPTIONAL, -- Need M
    srs-PowerControlAdjustmentStates            ENUMERATED { sameAsFci2,
separateClosedLoop}         OPTIONAL, -- Need S
    ...
}
SRS-ResourceSetId ::=           INTEGER (0..maxNrofSRS-ResourceSets-1)
```

The UE may perform L3 measurement on the path loss RS resource requiring initial measurement, configured in operation 1305, and may store and manage measurement values. In operation 1310, the UE receives an MAC CE for actually measuring a plurality of path loss RSs configured in operation 1305 and indicating a resource which needs to be applied from a base station. A specific MAC CE structure and a specific operation will be described in FIG. 14. In operation 1315, the UE may measure a path loss RS resource indicated through the received MAC CE, may calculate path loss, and may determine power for an SRS transmission signal in view of the path loss.

Figure 14:
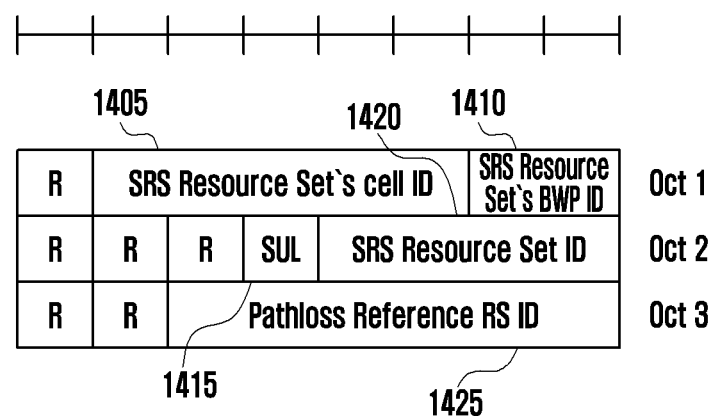
FIG. 14 illustrates an MAC CE and a mapping method for dynamic updating of a path loss RS requiring measurement according to an embodiment of the disclosure.

FIG. 14 illustrates an MAC CE and a mapping method for dynamic updating of a path loss RS requiring measurement according to an embodiment of the disclosure.

Referring to FIG. 14, a UE may configure a plurality of path loss RS resources in SRS-Config (specifically, an SRS-ResourceSet configuration) of an RRC message. Furcalculate transmission power, the resource may be updated to one of a plurality of path loss RSs through the MAC CE. The structure illustrated in FIG. 14 may be used.

Figure 15:
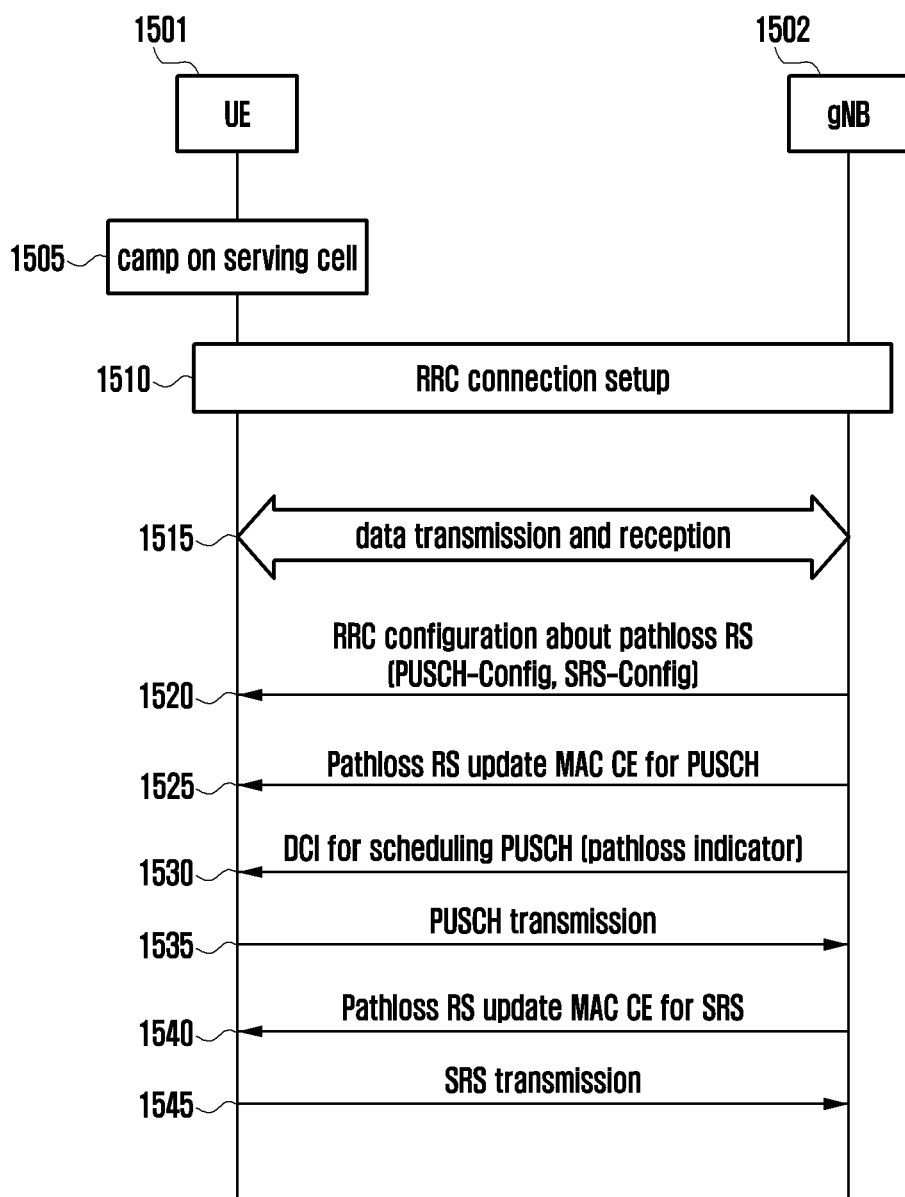
FIG. 15 illustrates an overall operation of a measurement and application of a path loss RS for PUSCH and SRS transmission according to an embodiment of the disclosure.

Serving cell ID including SRS resource set 1405: 5 bits
BWP ID including SRS resource set ID 1410: 2 bits
SUL indicator 1415: 1 bit
SRS resource set ID 1420: 4 bits
Path loss RS index 1425: 6 bits, path loss RS resource information indicating dynamic change to the UE FIG. 15 illustrates the overall operation of a measurement and application of a path loss RS for PUSCH and SRS transmission according to an embodiment of the disclosure.

Referring to FIG. 15, a UE 1501 may camp on a specific base station 1502, in operation 1505, and may perform RRC connection setup with a corresponding serving cell, in operation 1510. The UE 1501 may perform data transmission and reception with the base station 1502 in operation 1515, and the base station 1502 may provide configuration information for path loss calculation which the UE 1501 needs to consider for uplink transmission through an RRC configuration, in operation 1520. In operation 1520, the UE 1501 may receive PUSCH configuration information and SRS configuration information. The PUSCH configuration information may include a plurality of pieces (up to 64 pieces) of path loss RS configuration information required to determine signal strength and power for PUSCH transmission and configuration information about an association between an SRI and a path loss RS, and the SRS configuration information may include a plurality of pieces (up to 64 pieces) of path loss RS configuration information for SRS transmission configured per SRS-ResourceSet. In operation 1520, the UE 1501 may perform L3 measurement on up to four path loss RS resources requiring initial measurement configured for a PUSCH and an initial path loss resource configured for an SRS, and may store and manage measurement values.

In operation 1525, the UE 1501 may receive a path loss RS update MAC CE for updating mapping between the path loss RS and the SRI through the base station 1502 and may update and manage the mapping using information indicated by the MAC CE. In operation 1530, the UE 1501 may receive scheduling for uplink transmission (PUSCH) from the base station 1502 through DCI, and the control information may include not only scheduling resource information but also information indicating a specific path loss RS applied to calculation of signal strength and power for the transmission. That is, the path loss RS mapped with an SRI of the DCI may be indicated, and the UE 1501 may measure a corresponding path loss RS resource and may calculate path loss. In operation 1535, the UE 1501 may determine power for a PUSCH transmission signal considering the pass loss and may perform transmission.

The UE 1501 may perform SRS transmission according to a configured SRS transmission configuration while performing the foregoing operation, in which the UE 1501 may determine transmission power based on a path loss RS indicated through an initial RRC configuration. In operation 1540, the UE 1501 may receive an MAC CE indicating a path loss resource which needs to be measured and applied in actual SRS transmission from the base station 1502. In operation 1545, the UE 1501 may measure a path loss RS resource indicated by the received MAC CE, may calculate path loss, and may determine power for an SRS transmission signal in view of the pass loss.

Figure 16:
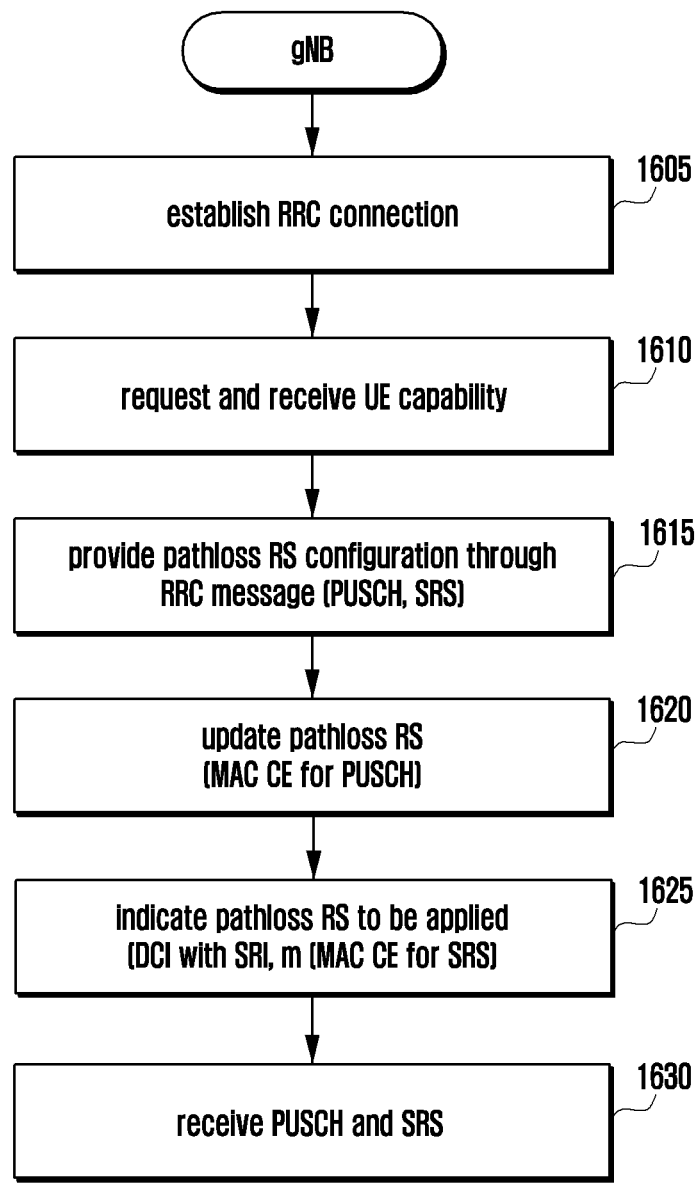
FIG. 16 illustrates an overall operation of a base station according to an embodiment of the disclosure.

FIG. 16 illustrates an overall operation of a base station to which the disclosure is applied according to an embodiment of the disclosure.

Referring to FIG. 16, the base station establishes connection setup with a UE, in operation 1605, and requests and receives a capability of the UE, in operation 1610. In operation 1610, the base station may determine whether the UE has a dynamic path loss RS updating capability according to the capability of the UE. Subsequently, in operation 1615, the base station may provide RRC configuration information to the UE in view of the capability of the UE. In operation 1615, the base station may provide a plurality of path loss RS configurations to the UE via a PUSCH configuration and an SRS configuration information. For a UE with a dynamic path loss RS updating capability, the base station may update information about mapping between a path loss RS and an SRI applicable to PUSCH transmission through an MAC CE, in operation 1620. In operation 1625, the base station may forward to the UE an indication for a path loss RS which needs to be applied to actual PUSCH and SRS transmission in association with an SRI index via DCI or may indicate to the UE a specific path loss RS index through an MAC CE. In operation 1630, the base station may receive an uplink signal transmitted from the UE.

According to the disclosure, in order to improve an MIMO operation in a next-generation mobile communication system, it is generally possible to update/indicate a beam (spatial relation) through a single MAC CE for a PUCCH resource in a specific bandwidth part (BWP) within one serving cell in an operation of a UE configuring and activating beam information (spatial relation) used for PUCCH transmission. However, since a plurality of PUCCH resources may be configured in one serving cell and a BWP, a plurality of MAC CE transmissions is required to update beam information about all the configured PUCCH resources, thus causing an increase in signaling and latency time. Therefore, the disclosure proposes a method in which a plurality of PUCCH resources is configured and pieces of information about beams for transmitting the plurality of PUCCH resources are simultaneously updated.

FIG. 17 illustrates a structure of a next-generation mobile communication system and a scenario in which a PUCCH resource configuration and a beam activation operation are applied according to an embodiment of the disclosure.

Referring to FIG. 17, there may be a plurality of cells served by NR gNBs operating based on a beam. A UE 1715 being connected to a specific cell (cell 1) 1705 may receive a configuration of a different serving cell (cell 2) 1710. Accordingly, the UE 1715 can transmit and receive data to and from a plurality of cells through CA. In an existing NR system, a physical downlink control channel (PDCCH) configuration and a physical downlink shared channel (PDSCH) configuration may be provided per serving cell and BWP through an RRC control signal, thereby providing configuration information for reception of a downlink control signal and a data signal and related reception beam configuration information may be provided (1720 and 1725). In addition, PUCCH-Config may be provided per serving cell and BWP through the RRC control signal, and a PUCCH resource and a related transmission beam may be simultaneously configured according to the configuration (1730 and 1735). Currently, in one cell group, one PUCCH SCell may be further configured in addition to a primary cell (PCell)/primary-secondary cell (PSCell). A method for configuring a PUCCH resource in a PUCCH resource configuration operation through an RRC control message is as follows.

PUCCH resource sets: A unit in which PUCCH resources having the same payload are grouped. PUCCH resources existing in one PUCCH resource set have the same payload size. Up to four PUCCH resource sets may be configured per BWP.
  PUCCH resources: Configuration information about an actual PUCCH resource is included, and up to 32 PUCCH resources may be configured per PUCCH resource set. The index of all PUCCH resources is 128
  Spatial relations info: Table 5 below shows information about beams though which the PUCCH resources are actually transmitted, and one beam may be selected from among a synchronization signal block (SSB), a channel state information reference signal (CSI-RS), and a sounding reference signals (SRS). Up to eight pieces of beam information may be configured per BWP, and the number of corresponding beams may be increased to 64 from 8 in Rel-16

TABLE 5

```
PUCCH-SpatialRelationInfo ::=   SEQUENCE {
  pucch-SpatialRelationInfoId   PUCCH-SpatialRelationInfoId,
  servingCellId                 ServCellIndex        OPTIONAL, -- Need S
  referenceSignal               CHOICE {
    ssb-Index                   SSB-Index,
    csi-RS-Index                NZP-CSI-RS-ResourceId,
    srs                         SEQUENCE {
      resource                  SRS-ResourceId,
      uplinkBWP                 BWP-Id
    }
  },
  pucch-PathlossReferenceRS-Id           PUCCH-PathlossReferenceRS-Id,
  p0-PUCCH-Id                            P0-PUCCH-Id,
  closedLoopIndex                        ENUMERATED { i0, i1 }
}
PUCCH-SpatialRelationInfoId ::=  INTEGER (1..maxNrofSpatialRelationInfos)
```

Based on the RRC configuration information about the PUCCH resource, the UE may transmit a PUCCH/ACK/NACK signal in response to a downlink signal. In addition, initial beam information associated with each PUCCH resource in the above operation may be beam information used in an initial RRC connection procedure (SSB in an initial RACH operation), and an MAC CE may be subsequently used to update beam information associated with a specific PUCCH resource. That is, a PUCCH spatial relation activation/deactivation MAC CE is used and has the following structure.

Reserved bits (included for byte alignment) 1745 and 1760

Serving Cell ID (5 bits) 1750

BWP ID (2 bits) 1755

PUCCH resource ID (7 bits) 1765

Spatial relation bitmap (1 bit, only one of up to eight bitmaps is activated) 1770

This operation indicates a beam through which a PUCCH resource in a serving cell and a BWP indicated by the MAC CE is transmitted. When receiving the MAC CE, the UE may update and apply information about a beam associated with the related PUCCH resource. As described above, PUCCH configuration information per BWP may be provided, and up to 128 PUCCH resources may be configured. Thus, updating through 128 MAC CEs may be required to update beam information about 128 configured PUCCH resources at worst, which increases latency in the corresponding operation and causes significant signaling overhead.

Figure 18:
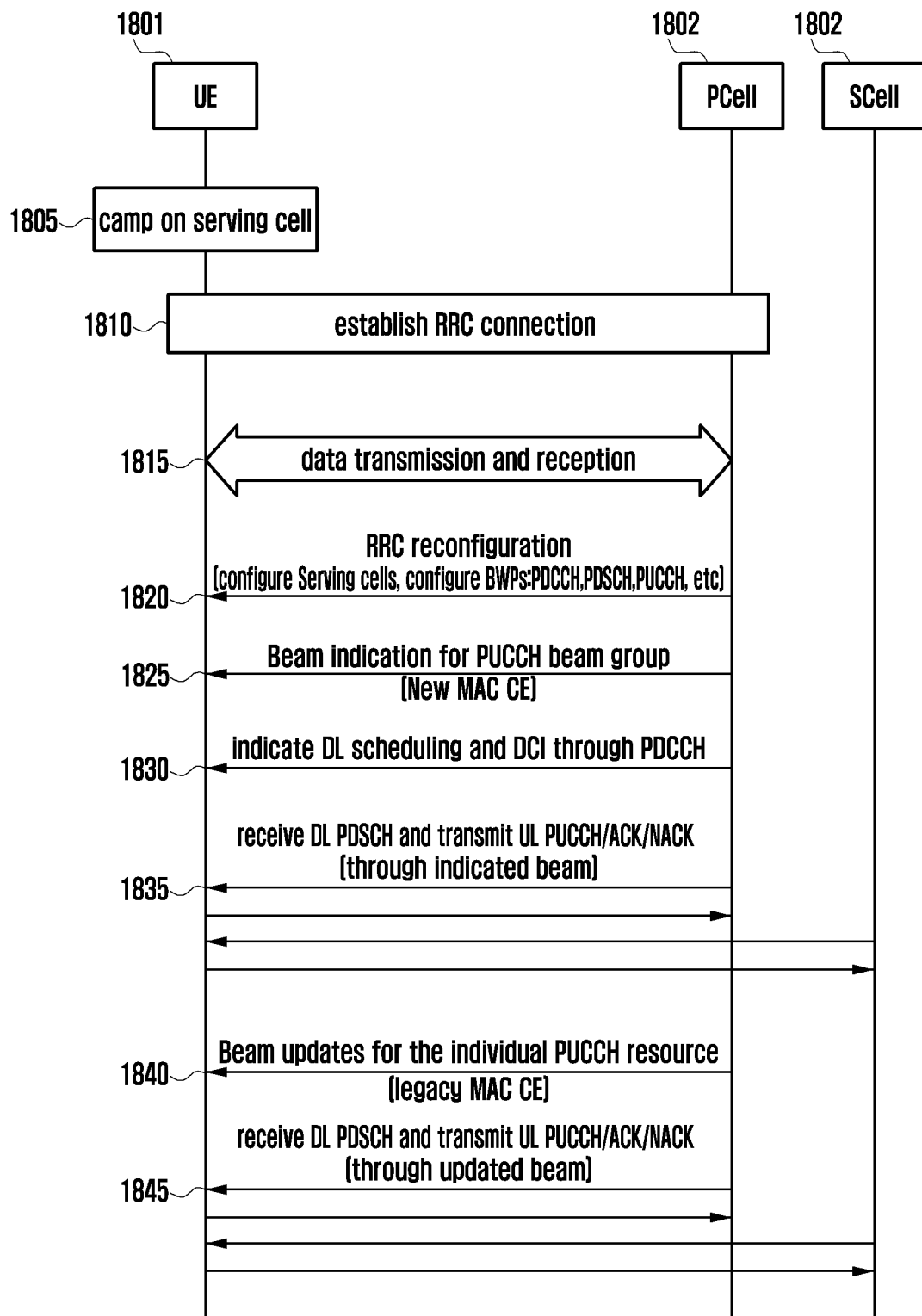
FIG. 18 illustrates an overall operation of simultaneously updating transmission beams by grouping a plurality of PUCCH resources configured through a plurality of serving cells and a BWP in an NR system according to an embodiment of the disclosure.

FIG. 18 illustrates an operation of simultaneously updating transmission beams by grouping a plurality of PUCCH resources configured through a plurality of serving cells and a BWP in an NR system according to an embodiment of the disclosure.

As described in FIG. 17, the NR system is designed to enable data transmission/reception between a UE and a base station using a beam with directivity. Currently, only activation/deactivation of a beam (transmission configuration indicator (TCI) state or PUCCH spatial relation) in a specific BWP in one serving cell is possible. In the disclosure, a method in which a plurality of PUCCH resources is configured as a group and beam updating operations for the plurality of PUCCH resources are simultaneously supported is considered. The following specific scenarios are applicable.

RRC configuration scenario 1: It is possible to configure a group for a plurality of serving cells and a plurality of PUCCH resources configured in a plurality of BWPs of the cells and to simultaneously update pieces of beam information applied to transmission (group configuration per cell group)

RRC configuration scenario 2: It is possible to configure a group for a single serving cell and a plurality of PUCCH resources configured in a plurality of BWPs of the cell and to simultaneously update pieces of beam information applied to transmission (group configuration per cell)

RRC configuration scenario 3: It is possible to configure a group for a single serving cell and a plurality of PUCCH resources configured in a single BWP of the cell and to simultaneously update pieces of beam information applied to transmission (group configuration per BWP)

According to the disclosure, it is possible to reduce latency time in a beam updating operation for a PUCCH resource and to reduce signaling overhead for the beam updating operation. The above three scenarios are different in level at which a group is configured for a plurality of PUCCH resources, and the groups may be configured and operated in cell group, cell, and BWP levels.

Referring to FIG. 18, a UE 1801 in an idle (RRC_IDLE) mode may search for a suitable cell, may camp on a corresponding base station, in operation 1805, and may then access the base station and a PCell 1802 when data to be transmitted is generated, in operation 1810. In the idle mode, the UE is not connected to a network for power saving and thus cannot transmit data. The UE needs to transition to a connected (RRC_CONNECTED) mode for data transmission. The UE camping means that the UE stays in the cell and receives a paging message to determine whether downlink data is transmitted. When the UE succeeds in accessing the base station and the PCell 1802, the UE changes a state thereof to the connected (RRC_CONNECTED) mode, and can perform data transmission and reception with the base station in the connected mode, in operation 1815.

In operation 1820, the base station may transmit configuration information (ServingCellConfig) for configuring a plurality of serving cells and BWPs to the UE through an RRC message in the RRC-connected state. The RRC message may include configuration information for reception through a PDCCH and a PDSCH (PDCCH-Config and PDSCH-Config) and configuration information for PUCCH transmission (PUCCH-Config). Specifically, the RRC message may include a BWP configuration (BWP-Uplink and BWP-Downlink), a CORESET configuration, a scrambling configuration, a TCI state (TCI-State in PDSCH-Config) configuration, and the like. For example, the TCI state configuration may be provided per downlink BWP of each serving cell and may be individually included in PDCCH-Config and PDSCH-Config, and a beam configuration for PUCCH resource transmission may be included in PUCCH-Config. In the PUCCH configuration, a PUCCH resource, a PUCCH resource set, spatial relation information, and the like may be configured, and details of the configuration are as described in FIG. 17. Particularly, in the above operation, the number of pieces of spatial relation information for a PUCCH resource may be increased from existing 8 to 64, which means that a beam resolution for PUCCH resource transmission can be further increased.

According to the disclosure, in operation 1820, for example, in order to pre-configure a plurality of PUCCH resource groups applicable to the same transmission beam in an RRC configuration, a plurality of PUCCH resources or PUCCH resource sets applicable to the same transmission beam according to application of the foregoing three scenario may be configured as a single group. Alternatively, a current PUCCH resource set may serve as a PUCCH resource group for performing simultaneous beam updating. The PUCCH resource group may be configured and operated in a cell group, cell, or BWP level according to a scenario. In this operation, information about an applied beam for an initial PUCCH resource group may be configured through the RRC message. In this case, PUCCH transmission may be performed for the PUCCH resource group in association with preset initial beam information until a beam information update is indicated through a separate MAC CE.

RRC configuration scenario 1: A plurality of serving cells and a plurality of PUCCH resources existing in a BWP may be configured as a single group/list in CellGroupConfig (one entry in the group is configured as serving cell ID+BWP ID+PUCCH resource ID or PUCCH resource set ID)

RRC configuration scenario 2: A plurality of PUCCH resources existing in a plurality of BWPs of a serving cell may be configured as a single group/list in ServingCellConfig (one entry in the group is configured as BWP ID+PUCCH resource ID or PUCCH resource set ID)

RRC configuration scenario 3: A plurality of PUCCH resources existing in a serving cell and a BWP may be configured as a single group/list in PUCCH-Config of a BWP (one entry in the group is configured as PUCCH resource ID or PUCCH resource set ID)

Table 6 illustrates an RRC message that can be transmitted when RRC configuration scenario 3 is applied.

TABLE 6

```
PUCCH-Config ::=                SEQUENCE {
  resourceSetToAddModList                SEQUENCE (SIZE (1..maxNrofPUCCH-ResourceSets))
OF PUCCH-ResourceSet   OPTIONAL, -- Need N
  resourceSetToReleaseList               SEQUENCE (SIZE (1..maxNrofPUCCH-ResourceSets))
OF PUCCH-ResourceSetIdOPTIONAL, -- Need N
  resourceToAddModList                   SEQUENCE (SIZE (1..maxNrofPUCCH-Resources)) OF
PUCCH-Resource    OPTIONAL, -- Need N
  resourceToReleaseList                  SEQUENCE (SIZE (1..maxNrofPUCCH-Resources)) OF
PUCCH-ResourceId    OPTIONAL, -- Need N
    format1         SetupRelease { PUCCH-FormatConfig }     OPTIONAL, -- Need
M
    format2         SetupRelease { PUCCH-FormatConfig }     OPTIONAL, -- Need
M
    format3         SetupRelease { PUCCH-FormatConfig }     OPTIONAL, -- Need
M
    format4         SetupRelease { PUCCH-FormatConfig }     OPTIONAL, -- Need
M
  schedulingRequestResourceToAddModList                    SEQUENCE (SIZE (1..maxNrofSR-
Resources)) OFSchedulingRequestResourceConfig
                     OPTIONAL, -- Need N
  schedulingRequestResourceToReleaseList                   SEQUENCE (SIZE (1..maxNrofSR-
Resources)) OFSchedulingRequestResourceId
                     OPTIONAL, -- Need N
  multi-CSI-PUCCH-ResourceList          SEQUENCE (SIZE (1..2)) OF PUCCH-ResourceId
OPTIONAL, -- Need M
  dl-DataToUL-ACK                       SEQUENCE (SIZE (1..8)) OFINTEGER (0..15)
OPTIONAL, -- Need M
  spatialRelationInfoToAddModList                              SEQUENCE    (SIZE
(1..maxNrofSpatialRelationInfos)) OF PUCCH-SpatialRelationInfo
                      OPTIONAL, -- Need N
  spatialRelationInfoToReleaseList       SEQUENCE (SIZE (1..maxNrofSpatialRelationInfos))
OF PUCCH-SpatialRelationInfoId
                     OPTIONAL, -- Need N
  pucch-PowerControl           PUCCH-PowerControl        OPTIONAL, -- Need M
  ...,
  [[       spatialRelationInfoToAddModListExt-r16                       SEQUENCE    (SIZE
(1..maxNrofSpatialRelationInfosExt)) OF PUCCH-SpatialRelationInfo-r16              OPTIONAL,
-- Need N
    spatialRelationInfoToReleaseListExt-r16                            SEQUENCE    (SIZE
(1..maxNrofSpatialRelationInfosExt)) OF PUCCH-SpatialRelationInfoId-r16 OPTIONAL,
-- Need N     resourceGroupToAddModList-r16     SEQUENCE (SIZE (1..maxNrofPUCCH-
ResourceGroup)) OF PUCCH-ResourceGroup     OPTIONAL, -- Need N
    resourceGroupToReleaseList-r16                             SEQUENCE (SIZE (1..maxNrofPUCCH-
ResourceGroup)) OF PUCCH-ResourceGroupId                          OPTIONAL, -- Need N ]]
}
PUCCH-ResourceGroup ::=            SEQUENCE {
  pucch-ResourceGroupId              PUCCH-ResourceGroupId,
  pucch-resourceList                 SEQUENCE (1..maxNrofPUCCH-Resources)) OF
PUCCH-ResourceId     OPTIONAL, -- Need N
```

TABLE 6-continued

```
    spatialRelationInfo-r16           PUCCH-SpatialRelationInfoId-r16     OPTIONAL,
-- Need R
}
PUCCH-ResourceGroupId::=                              INTEGER (0.. maxNrofPUCCH-ResourceGroup-1)
maxNrofSpatialRelationInfos                     INTEGER ::= 8
maxNrofSpatialRelationInfosExt                     INTEGER ::= 56
PUCCH-SpatialRelationInfo-r16 ::=                        SEQUENCE {
  pucch-SpatialRelationInfoId-r16                    PUCCH-SpatialRelationInfoId-r16,
  servingCellId     ServCellIndex                                OPTIONAL, -- Need S
  referenceSignal              CHOICE {
    ssb-Index           SSB-Index,
    csi-RS-Index        NZP-CSI-RS-ResourceId,
    srs         SEQUENCE {
            resource     SRS-ResourceId,
            uplinkBWP    BWP-Id
        }
  },
  pucch-PathlossReferenceRS-Id              PUCCH-PathlossReferenceRS-Id,
  p0-PUCCH-Id           P0-PUCCH-Id,
  closedLoopIndex            ENUMERATED { i0, i1 }
}
PUCCH-SpatialRelationInfoId-r16 ::=                           INTEGER (0..maxNrofSpatialRelationInfos-1-
r16)
maxNrofSpatialRelationInfos-1-r16 ::= 63
maxNrofSpatialRelationInfos-r16 ::= 64
```

Alternatively, an applied beam-updating operation for a plurality of PUCCH resources may be supported via an MAC rather than pre-configuring a plurality of PUCCH resource groups applicable to the same transmission beam in an RRC configuration as in operation 1820. In this case, the PUCCH resource group through the RRC configuration described above may be omitted. A specific MAC CE structure and operation according to an applied scenario will be described in the following embodiments.

In operation 1825, the base station transmits an MAC CE for indicating/updating a transmission beam for a PUCCH resource configured via the RRC configuration information. In the disclosure, the MAC CE used in this operation may be an MAC CE indicating simultaneous transmission beam updating for a plurality of PUCCH resources. The type and structure of the MAC CE applied in this operation may vary according to embodiments and may be classified as follows.

When an RRC-based method is used: A group ID and applied beam information may be provided based on PUCCH resource group information configured in an RRC control message. A specific structure will be mentioned in an embodiment below When a MAC CE-only method is used: The MAC CE includes the IDs of all PUCCH resource to which simultaneous beam updating is applied. A specific structure will be mentioned in an embodiment below According to the disclosure, simultaneous beam updating for a plurality of PUCCH resources may be possible in operation 1820, operation 1825. In operation 1830, the base station indicates downlink scheduling and downlink control information. The following embodiments provide specific method for updating. In operation 1835, data transmission and reception to which corresponding transmission and reception resources are applied may be performed through a downlink beam (TCI state) and an uplink beam (PUCCH resource transmission beam) indicated in operation 1825 and operation 1830. For example, the UE performs uplink data reception through a beam configured for communication with the base station. In particular, ACK/NACK transmission may be performed through a PUCCH resource.

In operation 1840, the base station may further transmit an MAC CE in order to update the previously transmitted MAC CE and may update activated and deactivated beams using the MAC CE. In the disclosure, operation 1840 is intended to perform updating of a beam for an individual PUCCH resource rather than simultaneous beam updating for a plurality of PUCCH resources. For example, simultaneous beam updating for a plurality of PUCCH resources may be activated in operation 1825, and beam updating for an individual PUCCH resource may be performed, in operation 1840, and communicate using the updated beam, in operation 1845.

The foregoing operation of configuring PUCCH resource as a group and simultaneously updating beams may update a beam by specifying a configured group ID or a specific group. Further, the foregoing operation may also support an operation of simultaneously updating beams for all additionally configured groups, which may be indicated by the MAC CE used in operation 1825, and the UE receiving the MAC CE may update beams for PUCCH resources for all the configured groups to an indicated beam. Alternatively, an additional group including all the groups may be configured in the RRC configuration operation of 1820. For example, PUCCH resources configured as a group may be configured in another group at the same time. A specific MAC CE structure and field will be described in a separate embodiment below.

The following embodiments propose specific methods in view of possible options as methods for supporting simultaneous beam updating for PUCCH resources described above. In particular, a third embodiment discloses a scenario in which an RRC reconfiguration is used as a method for configuring a PUCCH resource group. A fourth embodiment discloses a scenario in which all information about PUCCH resources requiring beam updating is included in a MAC CE. In addition, not only simultaneous beam updating for a PUCCH resource group including a plurality of PUCCH resources but also beam updating for an existing individual PUCCH resource is supported, thereby supporting an efficient beam updating operation in addition to a reduction in signaling overhead and latency time. An overall operation follows a flowchart illustrated in FIG. 18, and specific operations will be described in the following embodiments.

Figure 19:
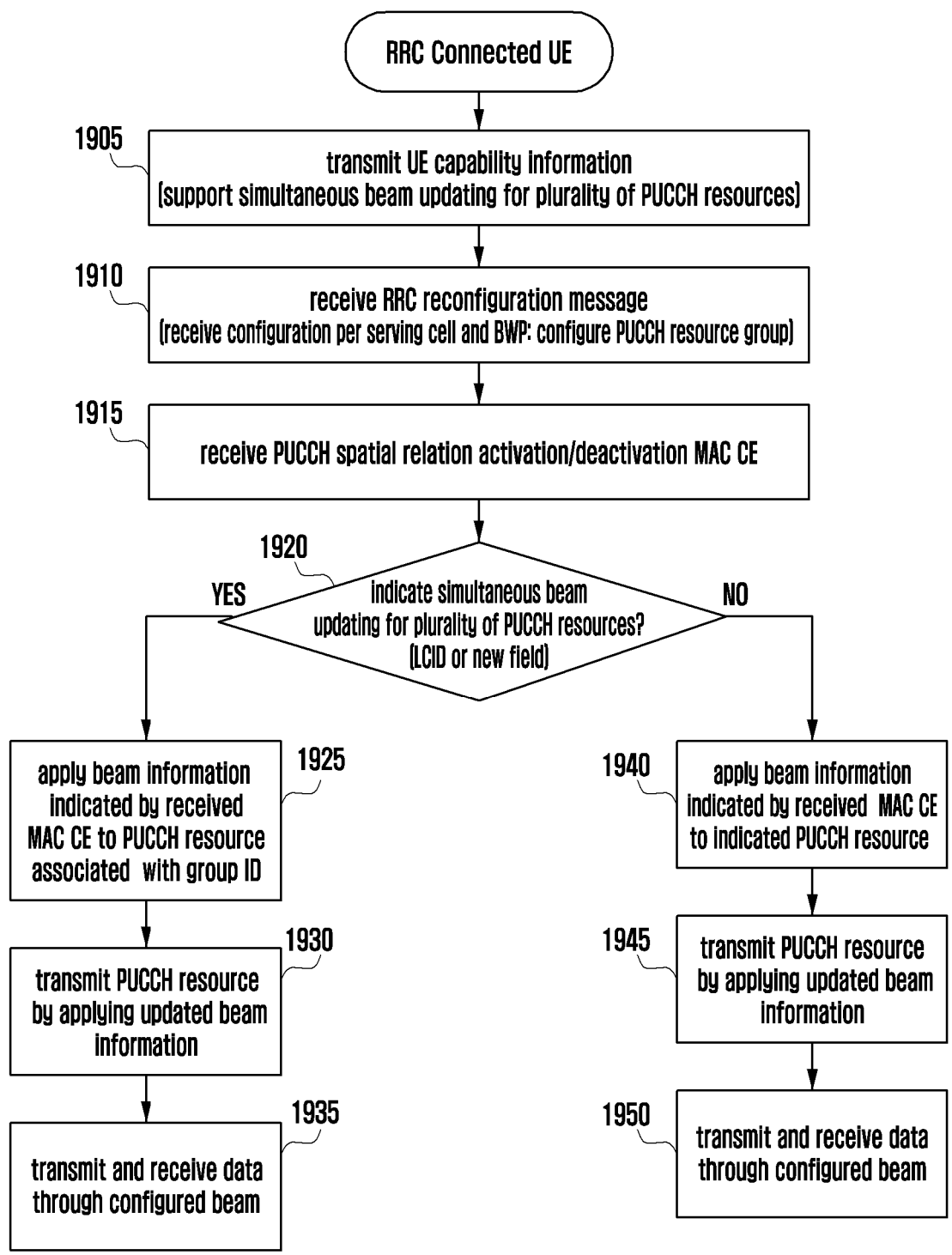
FIG. 19 illustrates a UE operation of configuring a PUCCH resource group via a radio resource control (RRC) control message and applying simultaneous beam updating for the PUCCH resource group through an MAC CE according to an embodiment of the disclosure.

FIG. 19 illustrates a UE operation of configuring a PUCCH resource group via an RRC control message and applying simultaneous beam updating for the PUCCH resource group through an MAC CE according to an embodiment of the disclosure.

Referring to FIG. 19, in operation 1905, a UE in an RRC-connected state generates, stores, and transmits UE capability information to a base station in response to a UE capability request message from the base station. Particularly, in this operation, the UE capability information includes information about whether simultaneous beam updating for a plurality of PUCCH resources is supported. To indicate this information, two methods illustrated below may be used.

1. First Method for Transmitting UE Capability

A one-bit indicator is employed to indicate whether the UE supports simultaneous beam updating for a plurality of PUCCH resources. When it is indicated that the UE supports a corresponding capability, the base station may establish a corresponding configuration.

2. Second Method for Transmitting UE Capability

An indicator is included to indicate whether the UE supports simultaneous beam updating for a plurality of PUCCH resources per specific band or band combination supported by the UE. The base station may configure a corresponding function only for a BC including the indicator.

When the indicators are indicated as TRUE in the foregoing methods for transmitting UE capability, the UE may equally apply the corresponding capability to all BWPs belonging to a component carrier of a UE or a BC in which the corresponding function is configured. Alternatively, a UE capability indicating that the corresponding capability is supported for each BWP may be added.

In operation 1910, the base station may transmit configuration information (ServingCellConfig) for configuring a plurality of serving cells to the UE through an RRC message. The RRC message includes configuration information for reception through a PDCCH and a PDSCH (PDCCH-Config and PDSCH-Config), and a beam configuration for PUCCH resource transmission may be included in PUCCH-Config. Specifically, the RRC message may include a BWP configuration (BWP-Uplink and BWP-Downlink), a CORESET configuration, a scrambling configuration, a TCI state (TCI-State in PDSCH-Config) configuration, a set of a PUCCH resource and a PUCCH resource, spatial relation information, and the like. For reference, regarding a spatial relation information configuration, while up to eight pieces of spatial relation information are supported, up to 64 pieces of spatial relation information may be determined and configured. Specifically, the TCI state configuration may be provided per downlink BWP of each serving cell and may be individually included in PDCCH-Config and PDSCH-Config, and a PUCCH resource configuration and a beam configuration for PUCCH resource transmission may also be included in PUCCH-Config. According to the third embodiment, in operation 1910, a list of PUCCH resources or PUCCH resource sets to which simultaneous beam updating for a plurality of PUCCH resources is applied is provided through the RRC message. The list is referred to as a PUCCH resource group in the disclosure, and the number of configured groups may be limited to four. However, this is merely an example, and the limited number may be set to a greater number. In addition, serving cell information (e.g., a SCell ID) and BWP information (e.g., a BWP ID) to which the same beam configuration is applied may also be configured along with a PUCCH resource ID or a PUCCH resource set ID in PUCCH-Config in which a PUCCH resource group is configured. A PUCCH resource ID or a PUCCH resource set ID including cell information (e.g., a SCell ID) and BWP information (e.g., a BWP ID) to which the corresponding function is applied may be provided at a CellGroupConfig or ServingCellConFIG. level. In this case, a PUCCH resource group configuration needs to be equally applied to each corresponding cell group or serving cell and may be applied to all indicated serving cells and BWPs.

In operation 1915, the UE may receive a MAC CE indicating a beam for PUCCH resource transmission from the base station. In this operation, the UE may receive a MAC CE indicating beam activation for an existing individual PUCCH resource or may receive a MAC CE indicating simultaneous beam updating for a plurality of newly defined PUCCH resources. A specific MAC CE structure will be described later.

In operation 1920, the UE analyzes the MAC CE received in operation 1915 to determine which operation is indicated and then performs a relevant operation. When the received MAC CE indicates simultaneous beam updating for a plurality of PUCCH resources (by allocating a new LCID or including indication information (e.g., a one-bit indicator) indicating simultaneous beam updating in an existing MAC CE field), the UE needs to apply beam information in the received MAC CE to a PUCCH resource group mapped to a PUCCH resource group ID indicated by the MAC CE, in operation 1925. A serving cell ID and a BWP ID indicated by the MAC CE in operation 1925 may be one serving cell and one BWP configured in a carrier and a BWP configured in operation 1910 and may be, for example, a PCell ID and an uplink active BWP ID. In operation 1930, the UE may update a beam for a PUCCH resource belonging to the PUCCH resource group indicated, in operation 1925. The UE may perform data transmission and reception through the configured beam in operation 1935, and may repeat operation 1920 when receiving a beam-updating MAC CE associated with a PUCCH resource again.

When the MAC CE received by the UE indicates beam activation for an individual PUCCH resource in operation 1920 (by allocating an existing LCID in an existing MAC CE, an existing MAC CE field not including indication information indicating beam updating for a plurality of serving cells and BWPs), the UE may apply relevant beam information about a PUCCH resource ID indicated by the received MAC CE, in operation 1940, and may perform a corresponding operation, for example, may update an associated beam, in operation 1945. In operation 1950, the UE may perform data transmission and reception through the configured beam. When a beam-updating MAC CE associated with a PUCCH resource is received again, operation 1920 may be repeated.

Figure 20:
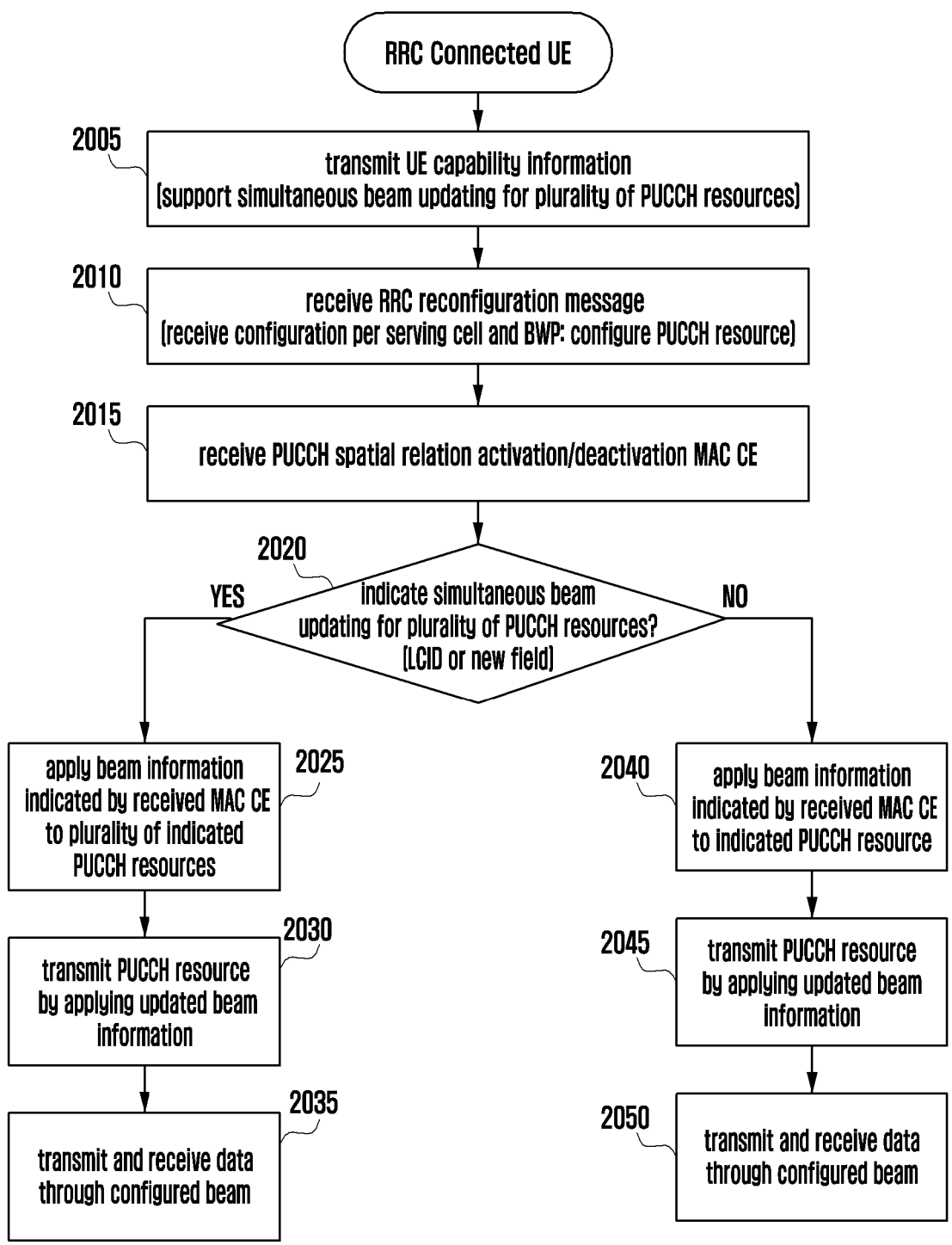
FIG. 20 illustrates an overall UE operation of supporting simultaneous beam updating for a PUCCH resource group through an MAC CE according to an embodiment of the disclosure.

FIG. 20 illustrates an overall UE operation of supporting simultaneous beam updating for a PUCCH resource group through an MAC CE according to an embodiment of the disclosure.

Referring to FIG. 20, in operation 2005, a UE in an RRC-connected state may generate, store, and transmit UE capability information to a base station in response to a UE capability request message from the base station. Particularly, in this operation, the UE capability information may include information about whether simultaneous beam updating for a plurality of PUCCH resources is supported. To indicate this information, two methods illustrated below may be used.

1. First Method for Transmitting UE Capability

A one-bit indicator is employed to indicate whether the UE supports simultaneous beam updating for a plurality of PUCCH resources. When it is indicated that the UE supports a corresponding capability, the base station may establish a corresponding configuration.

2. Second Method for Transmitting UE Capability

An indicator is included to indicate whether the UE supports simultaneous beam updating for a plurality of PUCCH resources per specific band or band combination supported by the UE. The base station may configure a corresponding function only for a BC including the indicator.

When the indicators are indicated as TRUE in the foregoing methods for transmitting UE capability, the UE may equally apply the corresponding capability to all BWPs belonging to a component carrier of a UE or a BC in which the corresponding function is configured. Alternatively, a UE capability indicating that the corresponding capability is supported for each BWP may be added.

In operation 2010, the base station may transmit configuration information (ServingCellConfig) for configuring a plurality of serving cells to the UE through an RRC message. The RRC message may include configuration information for reception through a PDCCH and a PDSCH (PDCCH-Config and PDSCH-Config). Further, a beam configuration for PUCCH resource transmission may be included in PUCCH-Config. Specifically, the RRC message may include a BWP configuration (BWP-Uplink and BWP-Downlink), a CORESET configuration, a scrambling configuration, a TCI state (TCI-State in PDSCH-Config) configuration, a set of a PUCCH resource and a PUCCH resource, spatial relation information, and the like. For reference, regarding a spatial relation information configuration, while up to eight pieces of spatial relation information are conventionally supported, up to 64 pieces of spatial relation information may be determined and configured. For example, the TCI state configuration may be provided per downlink BWP of each serving cell and may be individually included in PDCCH-Config and PDSCH-Config, and a PUCCH resource configuration and a beam configuration for PUCCH resource transmission may also be included in PUCCH-Config. According to the fourth embodiment, in operation 2010, a list of PUCCH resources or PUCCH resource sets to which simultaneous beam updating for a plurality of PUCCH resources is applied is not provided through the RRC message. That is, according to the fourth embodiment, a PUCCH resource group is not specified in an RRC configuration, but all PUCCH resources or PUCCH resource sets for which simultaneous beam updating is performed are indicated at once by an MAC CE transmitted, in operation 2015.

In operation 2015, the UE may receive an MAC CE indicating a beam for PUCCH resource transmission from the base station. In this operation, the UE may receive an MAC CE indicating beam activation for an existing individual PUCCH resource or may receive an MAC CE indicating simultaneous beam updating for a plurality of newly defined PUCCH resources. A specific MAC CE structure will be described later.

In operation 2020, the UE analyzes the MAC CE received in operation 2015 to determine which operation is indicated and then performs a relevant operation. When the received MAC CE indicates simultaneous beam updating for a plurality of PUCCH resources (by allocating a new LCID or including indication information (e.g., a one-bit indicator) indicating simultaneous beam updating in an existing MAC CE field), the UE may apply beam information in the received MAC CE to any PUCCH resource list indicated by the MAC CE, in operation 2025. For example, the MAC CE may include a plurality of PUCCH resource IDs or PUCCH resource set IDs. Further, the operation includes a PUCCH resource belonging to a different serving cell or a different BWP, a plurality of sets each of which includes a serving cell ID, a BWP ID, and a PUCCH resource ID may be provided. A serving cell ID and a BWP ID indicated by the MAC CE in operation 2025 may be one serving cell and one BWP configured in a carrier and a BWP configured in operation 2010 and may be, for example, a PCell ID and an uplink active BWP ID. In operation 2030, the UE updates a beam for the PUCCH resource list indicated, in operation 2025. The UE may perform data transmission and reception through the configured beam, in operation 2035, and may repeat operation 2020 when receiving a beam-updating MAC CE associated with a PUCCH resource again.

When the MAC CE received by the UE indicates beam activation for an individual PUCCH resource in operation 2020 (by allocating an existing LCID in an existing MAC CE, an existing MAC CE field not including indication information indicating beam updating for a plurality of serving cells and BWPs), the UE may apply relevant beam information about a PUCCH resource ID indicated by the received MAC CE, in operation 2040, and may perform a corresponding operation, for example, may update an associated beam, in operation 2045. The UE may perform data transmission and reception through the configured beam, in operation 2050, and may repeat operation 2020 when receiving a beam-updating MAC CE associated with a PUCCH resource again.

Figure 21:
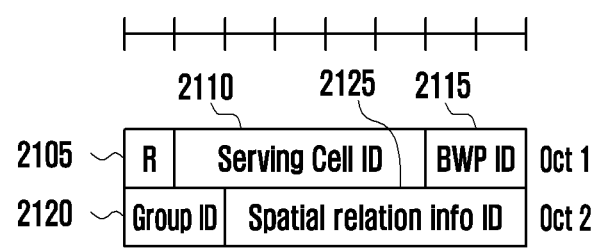
FIG. 21 illustrates an MAC CE structure according to an embodiment of the disclosure.

FIG. 21 illustrates an MAC CE structure according to an embodiment of the disclosure.

Figure 22:
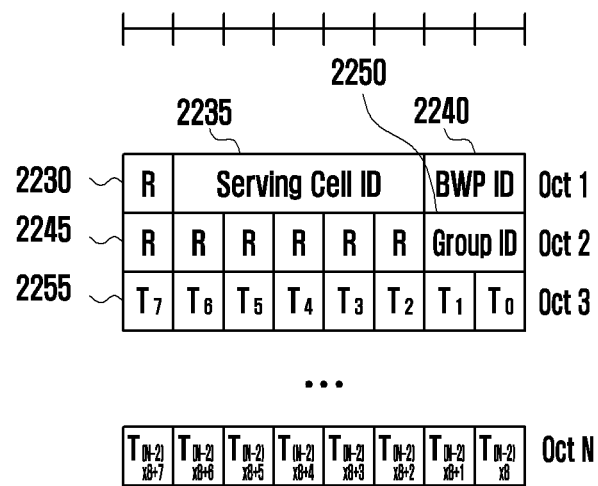
FIG. 22 illustrates an MAC CE structure according to an embodiment of the disclosure.

FIG. 22 illustrates an MAC CE structure according to an embodiment of the disclosure.

In an embodiment of the disclosure, a PUCCH resource group is configured via an RRC control message, and simultaneous beam updating for the PUCCH resource group is applied through an MAC CE. Thus, the PUCCH resource group is already configured in the RRC control message, and accordingly the MAC CE may use this information. The MAC CE has specific structures according to the following options.

Referring to FIG. 21, a new MAC CE may be used by introducing a new LCID. In this case, an MAC CE structure includes a reserved bit 2105, a serving cell ID 2110, and a BWP ID 2115 and may include a PUCCH resource group ID 2120 (which is, for example, four bits but may have an increased number of bits) configured via RRC and beam information 2125 associated with actual PUCCH resource transmission. First, a UE may recognize that the MAC CE is an MAC CE for simultaneous beam updating for a plurality of PUCCH resources through the LCID. One serving cell and BWP provided via a previous RRC configuration may be specified through the MAC CE, and simultaneous beam updating may be performed for all associated PUCCH resources configured via RRC through PUCCH resource group information.

Referring to FIG. 22, a new MAC CE may be used by introducing a new LCID. In this case, an MAC CE structure includes reserved bits 2230 and 2245, a serving cell ID 2235, and a BWP ID 2240, and may include a PUCCH resource group ID 2250 (which is, for example, four bits but may have an increased number of bits) configured via RRC and beam information

2255 in a bitmap format associated with actual PUCCH resource transmission. First, a UE may recognize that the MAC CE is an MAC CE for simultaneous beam updating for a plurality of PUCCH resources through the LCID. One serving cell and BWP provided via a previous RRC configuration may be specified through the MAC CE, and simultaneous beam updating may be performed for all associated PUCCH resources configured via RRC through PUCCH resource group information. Here, regarding the beam information 2255 in the bitmap format, only one piece may be set to 1, and a plurality of entities may be set to 1 when PUCCH transmission through a plurality of beams is required.

Figure 23:
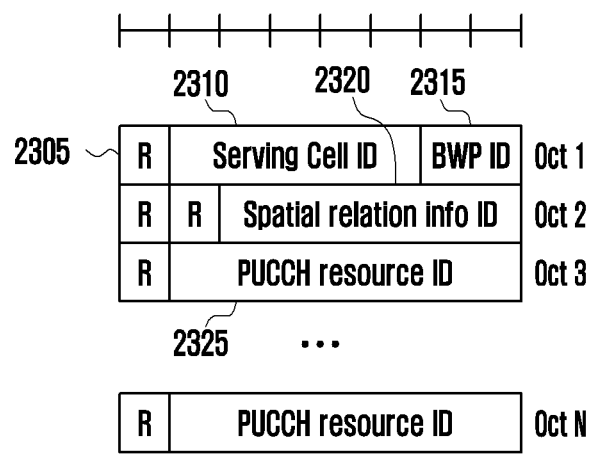
FIG. 23 illustrates an MAC CE structure according to an embodiment of the disclosure.

FIG. 23 illustrates an MAC CE structure according to an embodiment of the disclosure.

Figure 24:
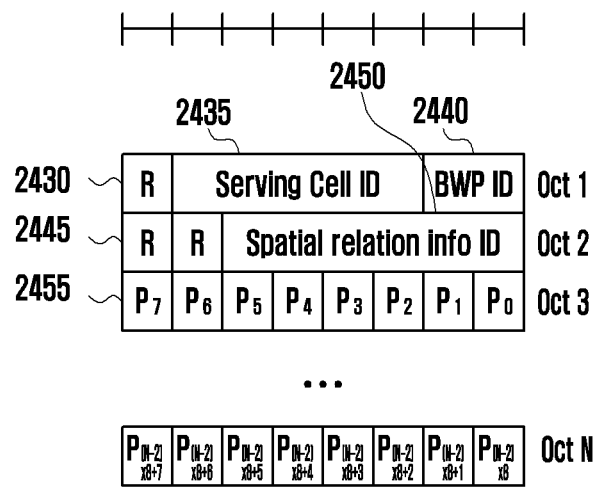
FIG. 24 illustrates an MAC CE structure according to an embodiment of the disclosure.

FIG. 24 illustrates an MAC CE structure according to an embodiment of the disclosure.

Figure 25:
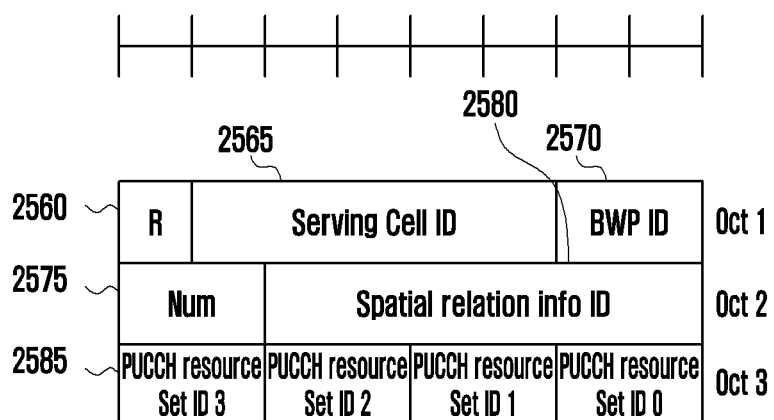
FIG. 25 illustrates an MAC CE structure according to an embodiment of the disclosure.

FIG. 25 illustrates an MAC CE structure according to an embodiment of the disclosure.

Figure 26:
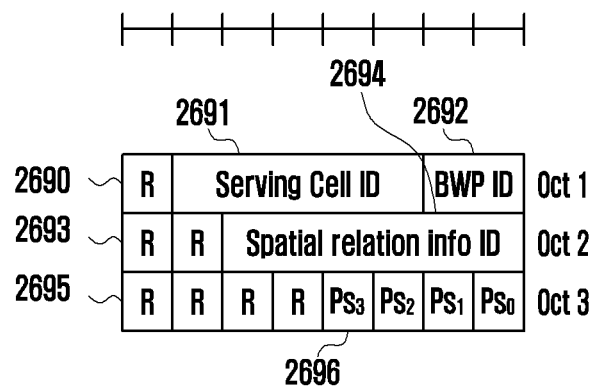
FIG. 26 illustrates an MAC CE structure according to an embodiment of the disclosure.

FIG. 26 illustrates an MAC CE structure according to an embodiment of the disclosure.

In an embodiment of the disclosure, simultaneous beam updating for a PUCCH resource group is supported through an MAC CE without an RRC configuration. For example, since PUCCH resource group information is not provided in advance through an RRC configuration, the MAC CE needs to include all relevant information (i.e., about a plurality of PUCCH resources) for simultaneous beam updating for a plurality of PUCCH resources. The MAC CE has specific structures according to the following options.

Referring to FIG. 23, a new MAC CE may be used by introducing a new LCID. In this case, an MAC CE structure includes a reserved bit 2305, a serving cell ID 2310, and a BWP ID 2315, and may include beam information 2320 associated with actual PUCCH resource transmission. In addition, a list 2325 of PUCCH resources requiring transmission via a beam actually indicated in 2320 may be provided. First, a UE may recognize that the MAC CE is an MAC CE for simultaneous beam updating for a plurality of PUCCH resources through the LCID. One serving cell and BWP provided via a previous RRC configuration may be specified through the MAC CE, and simultaneous beam updating may be performed for all PUCCH resources indicated through a plurality of PUCCH resource lists.

Referring to FIG. 24, a new MAC CE may be used by introducing a new LCID. In this case, an MAC CE structure includes reserved bits 2430 and 2445, a serving cell ID 2435, and a BWP ID 2440, and may include beam information 2450 associated with actual PUCCH resource transmission. In addition, a list 2455 of PUCCH resources requiring transmission via a beam actually indicated in 2450 may be provided in a bitmap format. First, a UE may recognize that the MAC CE is an MAC CE for simultaneous beam updating for a plurality of PUCCH resources through the LCID. One serving cell and BWP provided via a previous RRC configuration may be specified through the MAC CE, and simultaneous beam updating may be performed for all PUCCH resources indicated through a plurality of PUCCH resource lists. Here, regarding beam information (i.e., the list 2455) in the bitmap format, only one piece may be set to 1, and a plurality of entities may be set to 1 when PUCCH transmission through a plurality of beams is required.

Referring to FIG. 25, a new MAC CE may be used by introducing a new LCID. In this case, an MAC CE structure may include a reserved bit 2560, a serving cell ID 2565, and a BWP ID 2570, and may include the total number 2575 of PUCCH resource sets for which corresponding beam updating is performed and beam information 2580 associated with actual PUCCH resource transmission. In addition, a list 2585 of PUCCH resource sets requiring transmission via a beam actually indicated in beam information 2580 may be provided. First, a UE may recognize that the MAC CE is an MAC CE for simultaneous beam updating for a plurality of PUCCH resources through the LCID. One serving cell and BWP provided via a previous RRC configuration may be specified through the MAC CE, and simultaneous beam updating may be performed for all PUCCH resources indicated through a plurality of PUCCH resource set lists.

Referring to FIG. 26, a new MAC CE may be used by introducing a new LCID. In this case, an MAC CE structure may include reserved bits 2690, 2693, and 2695, a serving cell ID 2691, and a BWP ID 2692, and may include beam information 2694 associated with actual PUCCH resource transmission. In addition, a list 2696 of PUCCH resource sets requiring transmission via a beam actually indicated in beam information 2694 may be provided in a bitmap format. First, a UE may recognize that the MAC CE is an MAC CE for simultaneous beam updating for a plurality of PUCCH resources through the LCID. One serving cell and BWP provided via a previous RRC configuration may be specified through the MAC CE, and simultaneous beam updating may be performed for all PUCCH resources indicated through a plurality of PUCCH resource set lists. Here, regarding beam information (i.e., the list 2696) in the bitmap format, only one piece may be set to 1, and a plurality of entities may be set to 1 when PUCCH transmission through a plurality of beams is required.

Figure 27:
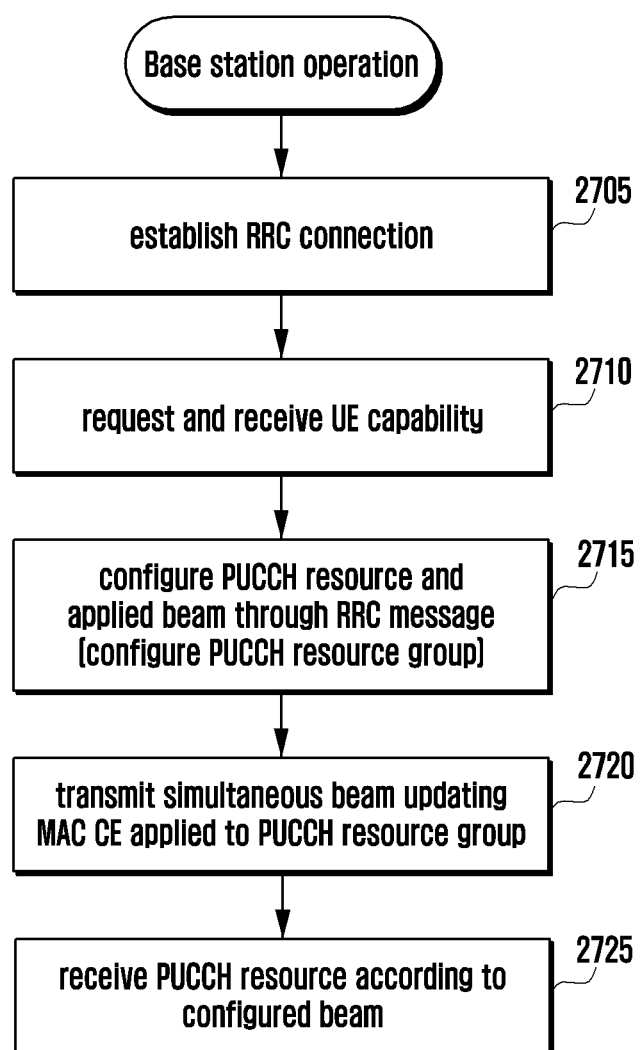
FIG. 27 illustrates the overall operation of a base station according to an according to an embodiment of the disclosure.

FIG. 27 illustrates an overall operation of a base station according to an embodiment of the disclosure.

Referring to FIG. 27, in operation 2705, the base station may establish an RRC connection state with a UE. In operation 2710, the base station may request a UE capability from the UE and may receive corresponding UE capability information. The base station may analyze the UE capability received in the above operation and may determine whether the UE has a capability of simultaneous beam updating for a plurality of PUCCH resources. Further, the base station may identify whether the base station has configured a corresponding function. Then, in operation 2715, the base station may provide configuration information about simultaneous beam updating for a plurality of PUCCH resources according to the UE capability to the UE through an RRC message. This operation corresponds to the third embodiment and additional operation is provided in this operation in the fourth embodiment. When the UE does not have the corresponding capability or the base station determines that a corresponding configuration is not necessary, the base station may provide configuration information for beam updating for basic PUCCH resources rather than providing the configuration information needed for simultaneous beam updating for a plurality of PUCCH resources.

In operation 2720, the base station may indicate beam updating by transmitting a beam-updating MAC CE for simultaneous beam updating for a plurality of PUCCH resources based on a PUCCH resource configuration and related beam configuration information (information necessary for simultaneous beam updating for a plurality of PUCCH resources) configured via RRC. In this operation, an existing beam indication MAC CE for a PUCCH resource may be used. In operation 2725, the base station may receive a PUCCH resource and may perform data communication according to a configured and indicated beam.

Figure 28:
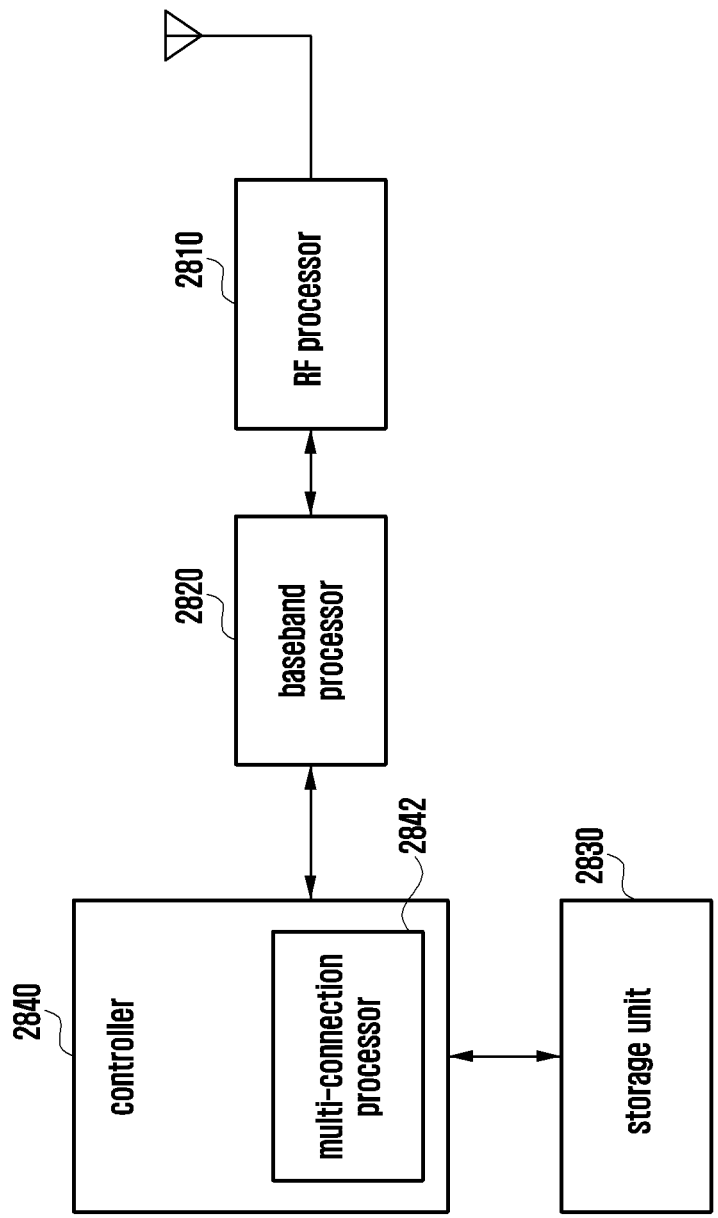
FIG. 28 is a block diagram illustrating an internal structure of a UE according to an embodiment of the disclosure.

FIG. 28 is a block diagram illustrating an internal structure of a UE according to an embodiment of the disclosure.

Referring to FIG. 28, the UE includes a radio frequency (RF) processor 2810, a baseband processor 2820, a storage unit 2830, and a controller 2840.

The RF processor 2810 performs a function for transmitting or receiving a signal through a wireless channel, such as band conversion and amplification of a signal. That is, the RF processor 2810 up converts a baseband signal, provided from the baseband processor 2820, into an RF band signal to transmit the RF band signal through an antenna, and down converts an RF band signal, received through the antenna, into a baseband signal. For example, the RF processor 2810 may include a transmission filter, a reception filter, an amplifier, a mixer, an oscillator, a digital-to-analog converter (DAC), and an analog-to-digital converter (ADC). Although FIG. 28 shows only one antenna, the UE may include a plurality of antennas. In addition, the RF processor 2810 may include a plurality of RF chains. Further, the RF processor 2810 may perform beamforming. For beamforming, the RF processor 2810 may adjust the phase and strength of each of signals transmitted and received through a plurality of antennas or antenna elements. The RF processor 2810 may perform MIMO and may receive a plurality of layers when performing MIMO.

The baseband processor 2820 performs a function of converting a baseband signal and a bit stream according to the physical-layer specification of a system. For example, in data transmission, the baseband processor 2820 encodes and modulates a transmission bit stream, thereby generating complex symbols. In data reception, the baseband processor 2820 demodulates and decodes a baseband signal, provided from the RF processor 2810, thereby reconstructing a reception bit stream. For example, according to OFDM, in data transmission, the baseband processor 2820 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processor 2820 divides a baseband signal, provided from the RF processor 2810, into OFDM symbols, reconstructs signals mapped to subcarriers through a fast Fourier transform (FFT), and reconstructs a reception bit stream through demodulation and decoding.

As described above, the baseband processor 2820 and the RF processor 2810 transmit and receive signals. Accordingly, the baseband processor 2820 and the RF processor 2810 may be referred to as a transmitter, a receiver, a transceiver, or a communication unit. At least one of the baseband processor 2820 and the RF processor 2810 may include a plurality of communication modules to support a plurality of different radio access technologies. Further, at least one of the baseband processor 2820 and the RF processor 2810 may include different communication modules for processing signals in different frequency bands. For example, the different radio access technologies may include a wireless LAN (for example, IEEE 802.11), a cellular network (for example, an LTE network), and the like. In addition, the different frequency bands may include a super high frequency (SHF) band (e.g., 2. NRHz or NRhz) and a millimeter wave band (e.g., 60 GHz).

The storage unit 2830 stores data, such as a default program, an application, and configuration information for operating the UE. In particular, the storage unit 2830 may store information on a second access node performing wireless communication using a second radio access technology. The storage unit 2830 provides stored data upon request from the controller 2840.

The controller 2840 controls overall operations of the UE. For example, the controller 2840 transmits and receives signals through the baseband processor 2820 and the RF processor 2810. Further, the controller 2840 records and reads data in the storage unit 2830. To this end, the controller 2840 may include at least one processor. For example, the controller 2840 may include a communication processor (CP) (e.g., multi-connection processor 2842) to perform control for communication and an application processor (AP) to control an upper layer, such as an application. The controller 2840, the baseband processor 2820, the RF processor 2810, and the storage unit 2830 may be electrically connected.

Figure 29:
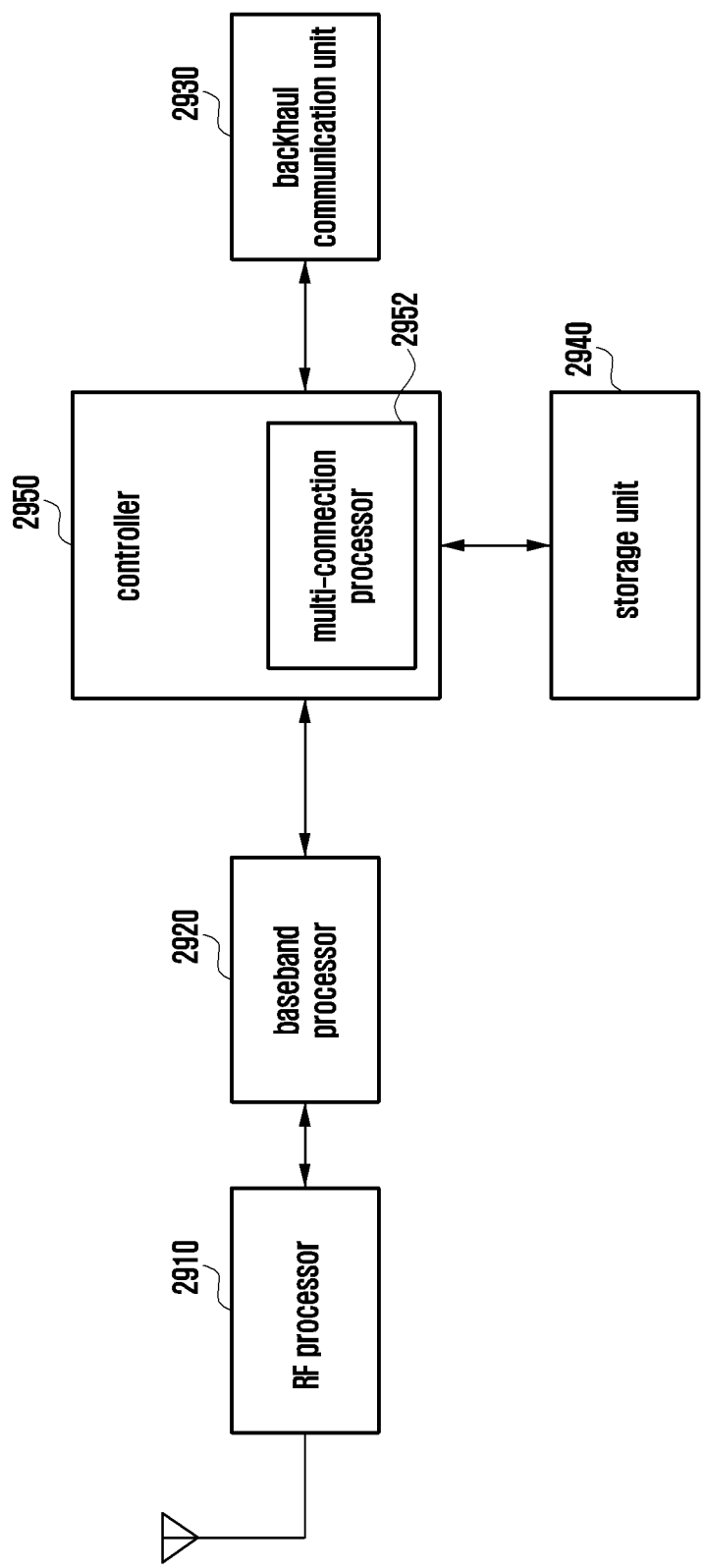
FIG. 29 is a block diagram illustrating a configuration of an NR base station according to an embodiment of the disclosure.

FIG. 29 is a block diagram illustrating a configuration of an NR base station according to an embodiment of the disclosure.

Referring to FIG. 29, the base station includes an RF processor 2910, a baseband processor 2920, a backhaul communication unit 2930, a storage unit 2940, and a controller 2950.

The RF processor 2910 performs a function for transmitting or receiving a signal through a wireless channel, such as band conversion and amplification of a signal. That is, the RF processor 2910 up converts a baseband signal, provided from the baseband processor 2920, into an RF band signal to transmit the RF band signal through an antenna, and down converts an RF band signal, received through the antenna, into a baseband signal. For example, the RF processor 2910 may include a transmission filter, a reception filter, an amplifier, a mixer, an oscillator, a DAC, and an ADC. Although FIG. 29 shows only one antenna, the base station may include a plurality of antennas. In addition, the RF processor 2910 may include a plurality of RF chains. Further, the RF processor 2910 may perform beamforming. For beamforming, the RF processor 2910 may adjust the phase and strength of each of signals transmitted and received through a plurality of antennas or antenna elements. The RF processor 2910 may transmit one or more layers, thereby performing downlink MIMO.

The baseband processor 2920 performs a function of converting a baseband signal and a bit stream according to the physical-layer specification of a first radio access technology. For example, in data transmission, the baseband processor 2920 encodes and modulates a transmission bit stream, thereby generating complex symbols. In data reception, the baseband processor 2920 demodulates and decodes a baseband signal, provided from the RF processor 2910, thereby reconstructing a reception bit stream. For example, according to OFDM, in data transmission, the baseband processor 2920 generates complex symbols by encoding and modulating a transmission bit stream, maps the complex symbols to subcarriers, and constructs OFDM symbols through an IFFT and CP insertion. In data reception, the baseband processor 2920 divides a baseband signal, provided from the RF processor 2910, into OFDM symbols, reconstructs signals mapped to subcarriers through an FFT, and reconstructs a reception bit stream through demodulation and decoding. As described above, the baseband processor 2920 and the RF processor 2910 transmit and receive signals. Accordingly, the baseband processor 2920 and the RF processor 2910 may be referred to as a transmitter, a receiver, a transceiver, a communication unit, or a wireless communication unit.

The backhaul communication unit 2930 provides an interface for performing communication with other nodes in a network. That is, the backhaul communication unit 2930 may convert a bit stream, transmitted from the base station to another node, for example, a secondary base station or a core network, into a physical signal, and may convert a physical signal, received from the other node, into a bit stream.

The storage unit 2940 stores data, such as a default program, an application, and configuration information for operating the base station. In particular, the storage unit 2940 may store information on a bearer allocated to a connected UE, a measurement result reported from a connected UE, and the like. In addition, the storage unit 2940 may store information as a criterion for determining whether to provide or stop a multi-connection to a UE. The storage unit 2940 provides stored data upon request from the controller 2950.

The controller 2950 controls overall operations of the base station. For example, the controller 2950 transmits and receives signals through the baseband processor 2920 and the RF processor 2910 or through the backhaul communication unit 2930. Further, the controller 2950 records and reads data in the storage unit 2940. To this end, the controller 2950 may include at least one processor (e.g., a multi-connection processor 2952). The controller 2950, the RF processor 2910, the baseband processor 2920, the backhaul communication unit 2930, and the storage unit 2940 may be electrically connected.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been illustrated in the detailed description of the disclosure, different modifications may be possible without departing from the scope of the disclosure. Therefore, the scope of the disclosure will be defined not by the described embodiments but by the appended claims to be mentioned and equivalents thereto.

What is claimed is:

1. A method performed by a terminal in a wireless communication system, the method comprising:
   receiving, from a base station, a radio resource control (RRC) message including information on mapping between sounding reference signal resource indicator (SRI) physical uplink shared channel (PUSCH) power control identifier (ID) and PUSCH pathloss reference reference signal (RS) ID values;
   receiving, from the base station, downlink control information (DCI) including an SRI;
   identifying a pathloss based on the DCI; and
   transmitting, to the base station, a PUSCH based on the identified pathloss,
   wherein the mapping is updated by a medium access control (MAC) control element (CE) received from the base station, and
   wherein the MAC CE includes:
      first information indicating a PUSCH pathloss reference RS ID which is to be updated in the mapping,
      second information indicating an SRI PUSCH power control ID mapped to the PUSCH pathloss reference RS ID, and
      third information indicating a presence of an additional SRI PUSCH power control ID mapped to the PUSCH pathloss reference RS ID.

2. The method of claim 1, wherein a number of the PUSCH pathloss reference RS ID values is configured up to 64.

3. The method of claim 1, wherein the MAC CE further includes information on a serving cell ID and information on a bandwidth part ID.

4. The method of claim 1, wherein the MAC CE is identified by a new logical channel ID value.

5. The method of claim 1, wherein the identifying of the pathloss based on the DCI comprises:
   identifying an RS for pathloss mapped to the SRI of the DCI; and
   identifying the pathloss using the identified RS for pathloss.

6. A method performed by a base station in a wireless communication system, the method comprising:
   transmitting, to a terminal, a radio resource control (RRC) message including information on mapping between sounding reference signal resource indicator (SRI) physical uplink shared channel (PUSCH) power control identifier (ID) and PUSCH pathloss reference reference signal (RS) ID values;
   transmitting, to the terminal, a medium access control (MAC) control element (CE) for updating the mapping; and transmitting, to the terminal, downlink control information (DCI) including an SRI,
wherein the MAC CE includes:
first information indicating a PUSCH pathloss reference RS ID which is to be updated in the mapping,
second information indicating an SRI PUSCH power control ID mapped to the PUSCH pathloss reference RS ID, and
third information indicating a presence of an additional SRI PUSCH power control ID mapped to the PUSCH pathloss reference RS ID.

7. The method of claim 6, wherein a number of the PUSCH pathloss reference RS ID values is configured up to 64.

8. The method of claim 6, wherein the MAC CE further includes information on a serving cell ID and information on a bandwidth part ID.

9. The method of claim 6, wherein the MAC CE is generated based on a new logical channel ID value.

10. The method of claim 6, wherein the SRI of the DCI is mapped to an RS for pathloss, and a pathloss for the PUSCH is associated with the RS for pathloss.

11. A terminal in a wireless communication system, the terminal comprising:
a transceiver; and
a controller configured to:
receive, from a base station via the transceiver, a radio resource control (RRC) message including information on mapping between sounding reference signal resource indicator (SRI) physical uplink shared channel (PUSCH) power control identifier (ID) and PUSCH pathloss reference reference signal (RS) ID values,
receive, from the base station via the transceiver, downlink control information (DCI) including an SRI,
identify a pathloss based on the DCI, and
transmit, to the base station via the transceiver, a PUSCH based on the identified pathloss,
wherein the mapping is updated by a medium access control (MAC) control element (CE) received from the base station, and
wherein the MAC CE includes:
first information indicating a PUSCH pathloss reference RS ID which is to be updated in the mapping,
second information indicating an SRI PUSCH power control ID mapped to the PUSCH pathloss reference RS ID, and
third information indicating a presence of an additional SRI PUSCH power control ID mapped to the PUSCH pathloss reference RS ID.

12. The terminal of claim 11, wherein a number of the PUSCH pathloss reference RS ID values is configured up to 64.

13. The terminal of claim 11, wherein the MAC CE further includes information on a serving cell ID and information on a bandwidth part ID.

14. The terminal of claim 11, wherein the MAC CE is identified by a new logical channel ID value.

15. The terminal of claim 11, wherein the controller is further configured to:
identify an RS for pathloss mapped to the SRI of the DCI, and
identify the pathloss using the identified RS for pathloss.

16. A base station in a wireless communication system, the base station comprising:
a transceiver; and
a controller configured to:
transmit, to a terminal via the transceiver, a radio resource control (RRC) message including information on mapping between sounding reference signal resource indicator (SRI) physical uplink shared channel (PUSCH) power control identifier (ID) and PUSCH pathloss reference reference signal (RS) ID values,
transmit, to the terminal via the transceiver, a medium access control (MAC) control element (CE) for updating the mapping, and
transmit, to the terminal via the transceiver, downlink control information (DCI) including an SRI,
wherein the MAC CE includes:
first information indicating a PUSCH pathloss reference RS ID which is to be updated in the mapping,
second information indicating an SRI PUSCH power control ID mapped to the PUSCH pathloss reference RS ID, and
third information indicating a presence of an additional SRI PUSCH power control ID mapped to the PUSCH pathloss reference RS ID.

17. The base station of claim 16, wherein a number of the PUSCH pathloss reference RS ID values is configured up to 64.

18. The base station of claim 16, wherein the MAC CE further includes information on a serving cell ID and information on a bandwidth part ID.

19. The base station of claim 16, wherein the MAC CE is generated based on a new logical channel ID value.

20. The base station of claim 16, wherein the SRI of the DCI is mapped to an RS for pathloss, and a pathloss for the PUSCH is associated with the RS for pathloss.

* * * * *